US007936253B2

(12) United States Patent
Ishimoto et al.

(10) Patent No.: US 7,936,253 B2
(45) Date of Patent: May 3, 2011

(54) REMOTE CONTROL SYSTEM

(75) Inventors: Kouichi Ishimoto, Daito (JP); Yasuo Masaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 755 days.

(21) Appl. No.: 11/805,484

(22) Filed: May 23, 2007

(65) Prior Publication Data

US 2007/0290884 A1 Dec. 20, 2007

(30) Foreign Application Priority Data

May 30, 2006 (JP) ................................ 2006-150186

(51) Int. Cl.
*G08C 19/00* (2006.01)
*B60R 25/10* (2006.01)
*G08B 1/08* (2006.01)
*G06F 7/04* (2006.01)

(52) U.S. Cl. ........... 340/13.24; 340/426.13; 340/539.14; 340/4.61; 340/5.33; 340/815.6

(58) Field of Classification Search ........................ None
See application file for complete search history.

(56) References Cited

U.S. PATENT DOCUMENTS

| | | | | |
|---|---|---|---|---|
| 7,362,229 | B2 * | 4/2008 | Brinton et al. | 340/572.1 |
| 7,365,736 | B2 * | 4/2008 | Marvit et al. | 345/156 |
| 7,436,319 | B1 * | 10/2008 | Harris et al. | 340/825.22 |
| 2001/0055978 | A1 * | 12/2001 | Herrod et al. | 455/517 |
| 2003/0034898 | A1 * | 2/2003 | Shamoon et al. | 340/825.72 |
| 2003/0156053 | A1 * | 8/2003 | Wall et al. | 341/176 |
| 2004/0246236 | A1 * | 12/2004 | Hildebrandt et al. | 345/169 |
| 2005/0256596 | A1 * | 11/2005 | Kataoka | 700/94 |
| 2010/0031295 | A1 * | 2/2010 | Krzyzanowski et al. | 725/52 |

FOREIGN PATENT DOCUMENTS

| | | |
|---|---|---|
| JP | 2000-32153 | 1/2000 |
| JP | 2002-291057 | 10/2002 |
| JP | 2003-198745 | 7/2003 |

OTHER PUBLICATIONS

Patent Abstracts of Japan for Japanese Publication No. 2003-198745, Publication Date Jul. 11, 2003 (1 page).
Patent Abstracts of Japan for Japanese Publication No. 2002-291057, Publication date Oct. 4, 2002 (1 page).
Patent Abstracts of Japan for Japanese Publication No. 2000-032153, Publication date Jan. 28, 2000 (1 page).

* cited by examiner

*Primary Examiner* — Davetta W Goins
*Assistant Examiner* — Fekadeselassie Girma
(74) *Attorney, Agent, or Firm* — Osha Liang LLP

(57) ABSTRACT

Source of input of an instruction to a remote controller is switched between manipulation on hand and external manipulation. A remote controller includes an instruction input portion accepting input of an instruction for controlling equipment, a supply accepting portion accepting supply of power from a cradle, a charging portion, a power storage portion, a control portion controlling an operation of the remote controller, a storage portion, an infrared light emission portion, and a display portion. The control portion includes a placement detection portion detecting whether or not the remote controller is mounted on the cradle, a selection portion switching between sources of input of the instruction from the instruction input portion based on a result of detection by the placement detection portion, and a control signal generation portion generating a control signal for controlling the equipment.

12 Claims, 22 Drawing Sheets

FIG.7

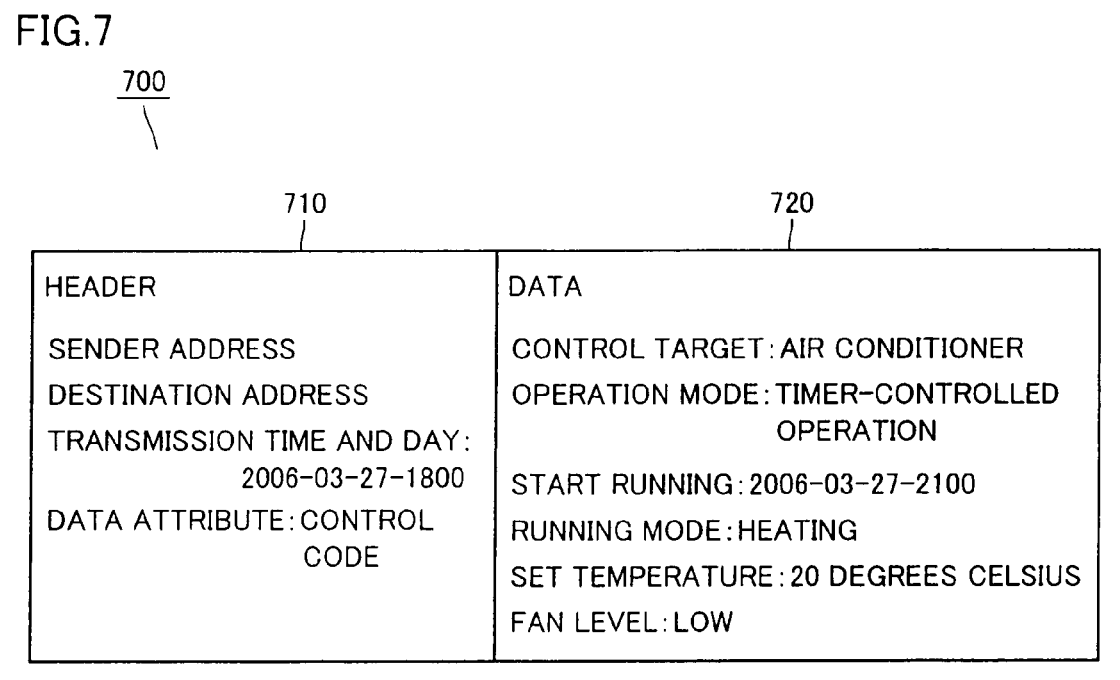

700

710 720

| HEADER | DATA |
|---|---|
| SENDER ADDRESS | CONTROL TARGET: AIR CONDITIONER |
| DESTINATION ADDRESS | OPERATION MODE: TIMER-CONTROLLED OPERATION |
| TRANSMISSION TIME AND DAY: 2006-03-27-1800 | START RUNNING: 2006-03-27-2100 |
| DATA ATTRIBUTE: CONTROL CODE | RUNNING MODE: HEATING |
| | SET TEMPERATURE: 20 DEGREES CELSIUS |
| | FAN LEVEL: LOW |

FIG.14

450

MEMORY 1410 1420 1430

| NUMBER | PASSWORD | CODE |
|---|---|---|
| 01 | 5963 | 0 |
| 02 | 4649 | 1 |
| ... | ... | ... |

1440 1450

| INPUT SOURCE OF CONTROL CODE | CODE |
|---|---|
| MANIPULATION BUTTON | 0 |
| EXTERNAL NETWORK | 1 |

FIG.16

450

1610 1620 1630

| No. | REGISTRANT IDENTIFICATION DATA | PRIORITY |
|---|---|---|
| 01 | user01@jp | 10 |
| 02 | user02@jp | 1 |
| 03 | user03@jp | 2 |
| ... | ... | ... |

1640 1650

| OPERATOR IDENTIFICATION DATA | PRIORITY |
|---|---|
| user03@jp | 2 |

REMOTE CONTROL SYSTEM

BACKGROUND OF THE INVENTION

1. Field of the Invention

The present invention relates to a technique to control equipment, and more particularly to a remote control system over a network.

2. Description of the Background Art

As to what is called a remote control device for controlling an operation of equipment, a remote control device permitting external manipulation over the network in addition to manipulation on hand has been known. The remote control device permits manipulation by a user holding the remote control device, that is, the manipulation on hand, and the manipulation based on control data obtained by reception of a signal transmitted via the Internet (hereinafter, referred to as "external manipulation"). Here, if the manipulation on hand and the external manipulation are simultaneously performed, the problem arises as to on which manipulation control should be based.

As to the technique for externally controlling equipment, for example, Japanese Patent Laying-Open No. 2003-198745 discloses a technique to prevent change of an operation state of equipment used in a house when the control of electrical appliances in the house is attempted by using a portable communication terminal to access a system.

In addition, Japanese Patent Laying-Open No. 2002-291057 discloses a remote control device with improved security as well as suppressed cost.

Moreover, Japanese Patent Laying-Open No. 2000-032153 discloses a remote control system eliminating restriction on positions where home appliances and a control console are placed.

According to the technique disclosed, for example, in Japanese Patent Laying-Open No. 2003-198745, however, if presence or absence at home is not sensed by a human-sensing sensor, the control based on external access is possible. Accordingly, while a user who was not sensed by the sensor for some reasons is manipulating the remote controller, input of an external signal may be accepted. In that case, the manipulation (selection of channel 200) different from the manipulation intended by the user (for example, selection of channel 100 on television) may be performed.

SUMMARY OF THE INVENTION

The present invention was made to solve the above-described problems. An object of the present invention is to provide a remote control system capable of controlling equipment by properly making selection between control based on the manipulation on hand and control based on the external manipulation.

In summary, a remote control system according to one aspect of the present invention includes a remote control terminal for controlling equipment. The remote control terminal includes a reception portion receiving a control signal for controlling the equipment through a communication line, an input portion accepting input of an instruction for controlling the equipment, a generation portion generating an infrared signal for controlling the equipment, a power storage portion, and a sensing portion sensing charging to the power storage portion. The remote control system includes a cradle apparatus for charging the remote control terminal. The cradle apparatus includes a detection portion detecting whether or not the remote control terminal is placed in the cradle apparatus, a charging portion charging the remote control terminal, and a display portion displaying that the remote control terminal is permitted to control the equipment through the communication line when it is detected that the remote control terminal is placed in the cradle apparatus. The remote control terminal includes a control portion causing the generation portion to generate the infrared signal based on the control signal received by the reception portion when charging is sensed, a light-emission portion emitting the infrared signal generated by the generation portion, and a display portion displaying a state of control of the equipment based on the control signal received by the reception portion.

A remote control system according to another aspect of the present invention includes a remote control terminal for controlling equipment and a cradle apparatus accepting placement of the remote control terminal. The remote control terminal includes a reception portion receiving a signal instructing control of the equipment through a communication line, an input portion accepting input of an instruction for controlling the equipment, a detection portion detecting whether or not the remote control terminal is placed in the cradle apparatus, a selection portion selecting a source of input of a signal used for generating the control signal for controlling the equipment, from between the reception portion and the input portion, based on a result of detection by the detection portion, a generation portion generating the control signal based on a signal from the source of input selected by the selection portion, and an emission portion emitting the control signal.

Preferably, the remote control terminal further includes a power storage portion. The cradle apparatus includes a power supply portion accepting external supply of power, and a charging portion charging the power storage portion based on the power. The detection portion detects placement of the remote control terminal in the cradle apparatus based on sensing of charging to the power storage portion.

Preferably, the remote control terminal includes a housing having a recess portion formed. The cradle apparatus has a projection portion corresponding to the recess portion formed. The detection portion detects placement of the remote control terminal in the cradle apparatus based on sensing of fitting of the recess portion and the projection portion to each other.

Preferably, the selection portion selects the reception portion as the source of input when it is detected that the remote control terminal is placed in the cradle apparatus, and selects the input portion as the source of input when it is detected that the remote control terminal is not placed in the cradle apparatus.

Preferably, the remote control terminal further includes a display portion displaying a state of the remote control terminal.

Preferably, the remote control terminal further includes a storage portion storing control data defining selection of the source of input, a prohibiting portion prohibiting selection by the selection portion based on external input of the control data when the remote control terminal is not placed in the cradle apparatus, and a switching portion selecting the reception portion as the source of input.

Preferably, the storage portion stores a password input in advance through the input portion. The switching portion checks whether or not data newly input through the input portion matches with the password, and selects the reception portion as the source of input when the data matches with the password.

Preferably, the remote control terminal further includes a storage portion storing control data defining selection of the source of input, a prohibiting portion prohibiting selection by the selection portion based on external input of the control data when the remote control terminal is placed in the cradle apparatus, and a switching portion selecting the input portion as the source of input.

Preferably, the storage portion stores a password input in advance through the input portion. The switching portion checks whether or not data newly input through the input portion matches with the password, and selects the input portion as the source of input when the data matches with the password.

Preferably, the remote control terminal further includes a storage portion storing a state data representing a state of the remote control terminal, and a transmission portion transmitting the state data to the cradle apparatus. The cradle apparatus further includes a reception portion receiving the state data, and a display portion displaying a state of the remote control terminal based on the state data.

Preferably, the signal received by the reception portion includes identification data for specifying a transmission source of the signal. The remote control terminal further includes a storage portion storing the identification data and precedence data associated in advance with the identification data for defining priority of a plurality of pieces of the identification data, and an obtaining portion obtaining the identification data from the signal received by the reception portion. When the reception portion selected as the source of input receives signals from a plurality of transmission sources, the generation portion selects a signal transmitted from any of the plurality of transmission sources based on the identification data obtained by the obtaining portion and the precedence data associated with the identification data, and generates the control signal based on the selected signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows a configuration of a signal 700 received by remote controller 200.

FIG. 14 is a conceptual diagram of one manner of storage of data in memory 450 of remote controller 1300 according to Embodiment 4 of the present invention.

FIG. 16 is a conceptual diagram of one manner of storage of data in memory 450 realizing a remote controller according to Embodiment 5 of the present invention.

DESCRIPTION OF THE PREFERRED EMBODIMENTS

Figure 1:
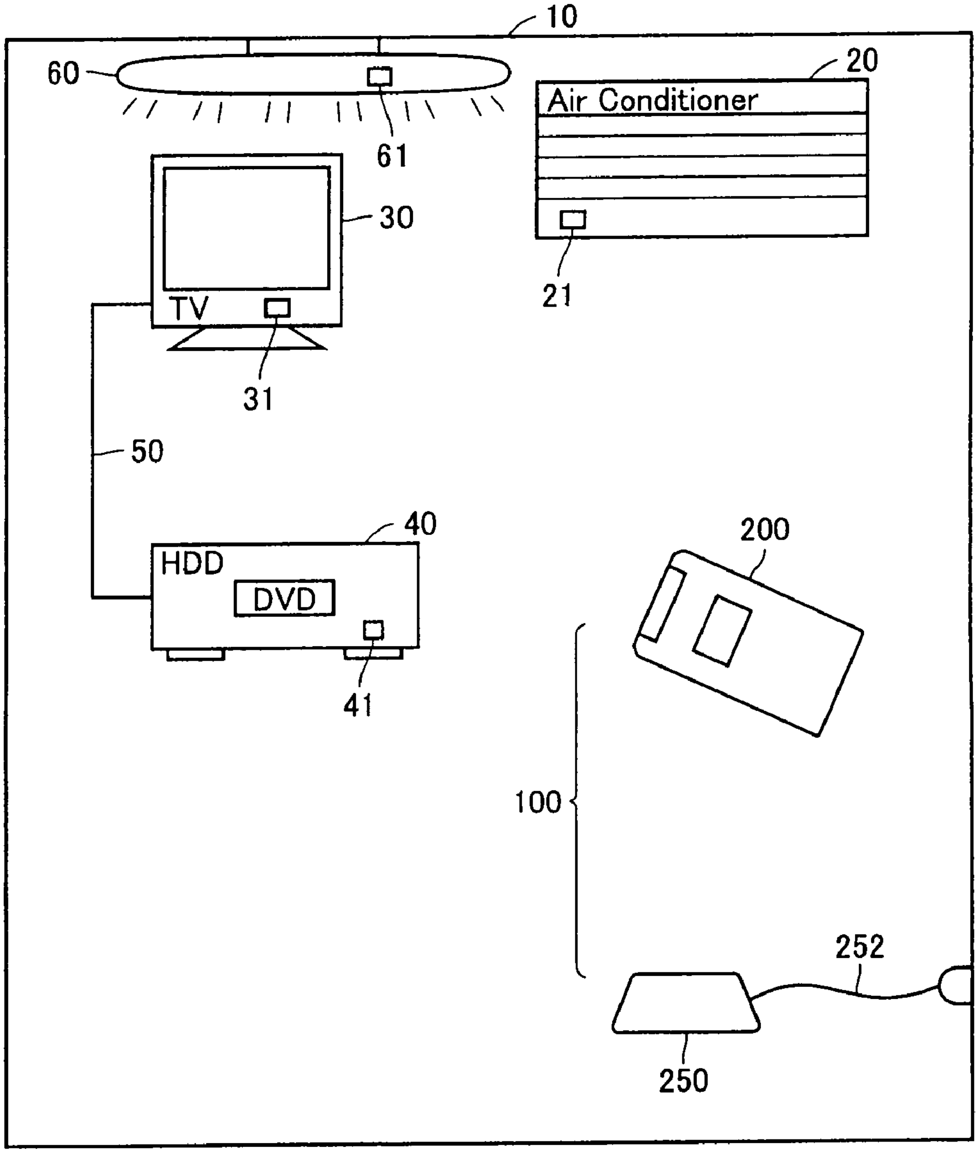
FIG. 1 shows arrangement of a remote control system 100 according to Embodiment 1 of the present invention and each piece of control target equipment controlled by remote control system 100.

An embodiment of the present invention will be described hereinafter with reference to the drawings. In the description below, the same elements have the same reference characters allotted. Their name and function are also the same. Therefore, detailed description thereof will not be repeated.

Embodiment 1

With reference to FIG. 1, a manner of use of a remote control system 100 according to an embodiment of the present invention will be described. FIG. 1 shows arrangement of remote control system 100 according to Embodiment 1 of the present invention and each piece of control target equipment controlled by remote control system 100. Remote control system 100 is used in a room 10.

In room 10, an air conditioner 20, a television 30, a hard disk recorder 40 connected to television 30, and an illumination device 60 are provided. Television 30 and hard disk recorder 40 are connected to each other via a cable 50. Air conditioner 20 includes a light-receiving portion 21 receiving an infrared signal for controlling an operation of air conditioner 20. Television 30 includes a light-receiving portion 31 receiving an infrared signal for controlling an operation of television 30. Hard disk recorder 40 includes a light-receiving portion 41 receiving an infrared signal for controlling an operation of hard disk recorder 40. Illumination device 60 includes a light-receiving portion 61 receiving an infrared signal for controlling an operation of illumination device 60. The operation of illumination device 60 includes turn-on/off or change in luminance.

Remote control system 100 includes a remote controller 200 and a cradle 250 accepting attachment of remote controller 200. Cradle 250 is connected to an outlet (not shown) of commercial power supply provided in room 10 via a power supply cable 252.

Figure 2:
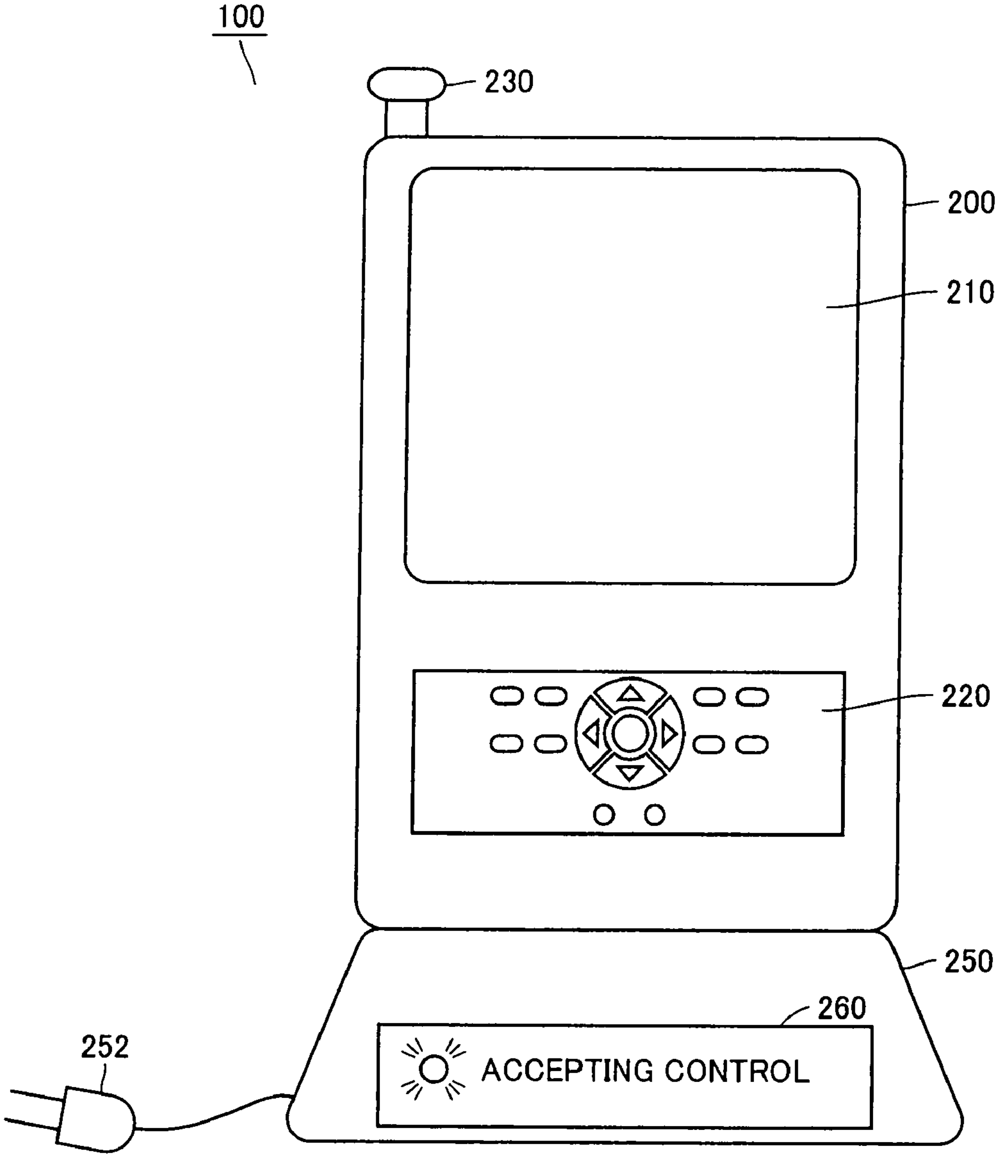
FIG. 2 shows appearance of remote control system 100.

With reference to FIG. 2, a configuration of remote control system 100 will be described. FIG. 2 shows overall remote control system 100.

In remote control system 100, remote controller 200 includes an antenna 230, a display 210, and a manipulation button 220. Antenna 230 receives a signal for controlling equipment via a communication line.

Display 210 displays a screen representing a state of operation caused by remote controller 200. Display 260 is implemented, for example, as a liquid crystal display or an organic EL (Electro Luminescence) display.

Manipulation button 220 accepts input of manipulation by a user, that is made in order to control the equipment. Manipulation button 220 includes, for example, numeric keys, keys for moving a cursor displayed on display 210 in an up/down or left/right direction.

In remote control system 100, cradle 250 includes a display 260. Display 260 displays a screen representing a state of an operation of cradle 250. The state of the operation of cradle 250 includes a screen representing, for example, whether cradle 250 is being charged or not or whether remote controller 200 is placed in cradle 250 or not. Display 260 is implemented, for example, as a liquid crystal display or an organic EL display.

Figure 3:
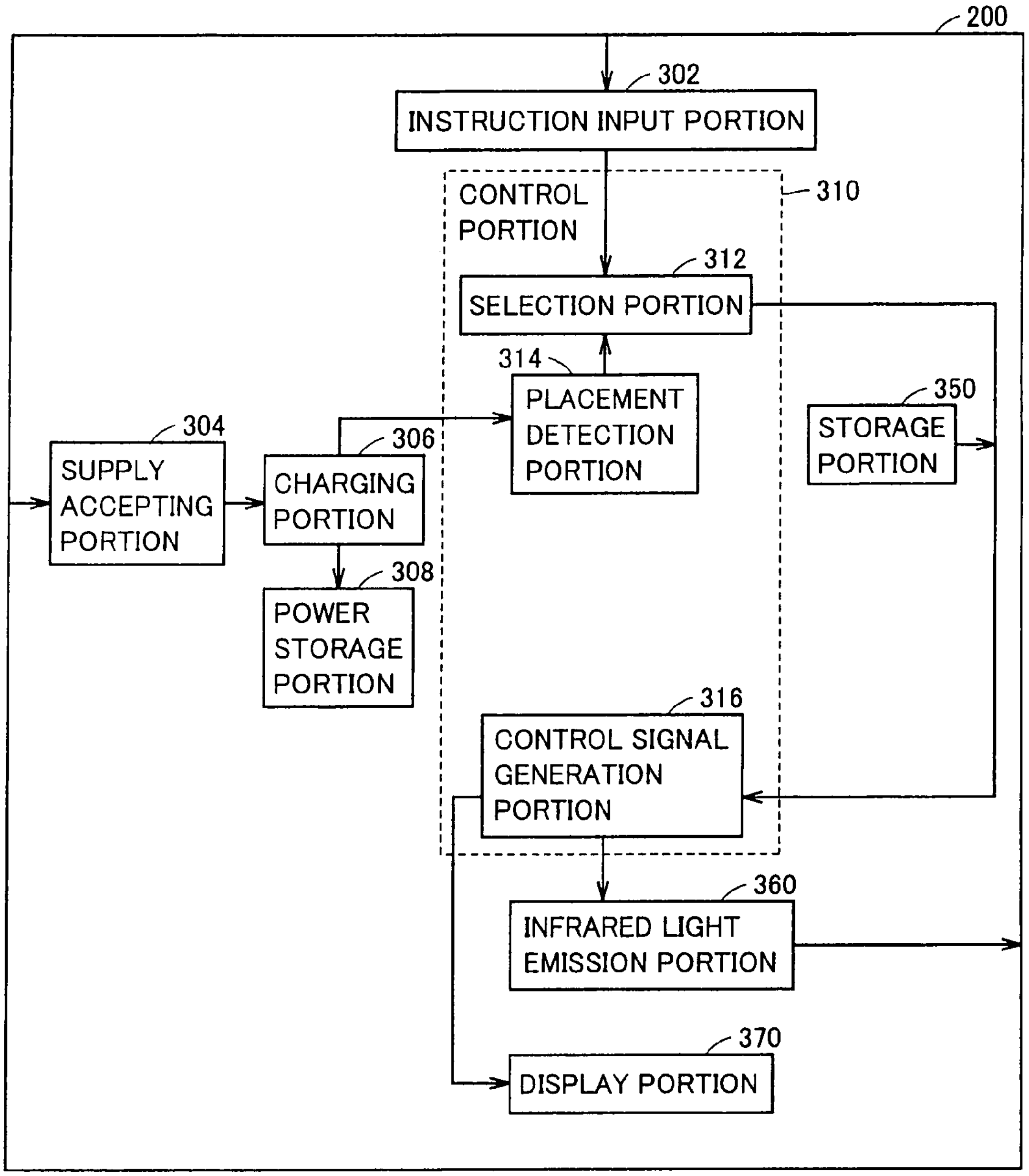
FIG. 3 is a block diagram showing a configuration of functions attained by a remote controller 200.

With reference to FIG. 3, a configuration of remote controller 200 will further be described. FIG. 3 is a block diagram showing a configuration of functions attained by remote controller 200. Remote controller 200 mainly includes an instruction input portion 302, a supply accepting portion 304, a charging portion 306, a power storage portion 308, a control portion 310, a storage portion 350, an infrared light emission portion 360, and a display portion 370. Control portion 310 includes a selection portion 312, a placement detection portion 314, and a control signal generation portion 316.

Instruction input portion 302 accepts input of an instruction for controlling the equipment. Instruction input portion 302 is realized, for example, as a circuit for detecting the instruction included in a signal received through manipulation button 220 or antenna 230 shown in FIG. 2.

Supply accepting portion 304 accepts supply of power from cradle 250. Supply accepting portion 304 is implemented, for example, as a metal piece configured to conduct at a contact with cradle 250.

Charging portion 306 accumulates power accepted by supply accepting portion 304 in power storage portion 308. Charging portion 306 detects a current value of power storage portion 308, and detects that a current value attains to 0 or that a charged state in power storage portion 308 attains a full charge state. Charging portion 306 is realized as a voltmeter, an ammeter, and combination of circuits between the commercial power supply and a rechargeable battery.

Power storage portion 308 accumulates charges supplied from charging portion 306 and supplies power to each component of remote controller 200. Power storage portion 308 is implemented, for example, as a nickel metal hydride battery or a lithium-ion battery.

Control portion 310 controls an operation of remote controller 200 based on an instruction from instruction input portion 302, an output from charging portion 306, or data stored in storage portion 350. Specifically, placement detection portion 314 detects whether or not remote controller 200 is mounted at a position defined in advance in cradle 250. Placement detection portion 314 detects placement of remote controller 200 in cradle 250, for example, based on a signal value representing a state of charging by charging portion 306. Alternatively, if charging by charging portion 306 is not being performed, placement detection portion 314 senses that remote controller 200 is not placed in cradle 250.

Selection portion 312 makes switching between sources of input of instructions through instruction input portion 302, based on a result of detection by placement detection portion 314. Specifically, if remote controller 200 is placed in cradle 250, selection portion 312 selects an external input, that is, a signal received through antenna 230, as the input source. Here, if the signal includes a control code for controlling an operation of the equipment, control of the control target equipment based on that signal can be carried out.

Meanwhile, if placement detection portion 314 detects that remote controller 200 is not placed in cradle 250, selection portion 312 selects input through manipulation button 220 as the instruction input source. For example, if the user of remote controller 200 holds remote controller 200, remote controller 200 and cradle 250 are separate from each other. Here, instruction input portion 302 is implemented by manipulation button 220, and the signal received by antenna 230 is not used for generation of the control signal for controlling the operation of the equipment.

Storage portion 350 stores data representing relation between the input instruction and the output control signal, for each piece of equipment controlled by remote controller 200. Storage portion 350 further stores data fixed in advance with regard to remote controller 200 (such as a manufacturer number and a serial number).

Control signal generation portion 316 generates a control signal for controlling the equipment based on a result of selection by selection portion 312 and the data stored in storage portion 350. Specifically, control signal generation portion 316 generates the control signal by using a signal included in any input source selected by selection portion 312 (that is, manipulation button 220 or external input) and the manufacturer number of remote controller 200 stored in storage portion 350. A configuration of the control signal will be described later.

Infrared light emission portion 360 emits a control signal generated by control signal generation portion 316 as an infrared signal. Display portion 370 shows a state of control by remote controller 200 based on the signal generated by control signal generation portion 316. This state includes, for example, contents of the signal output to the control target equipment or a state of remote controller 200 itself.

Figure 4:
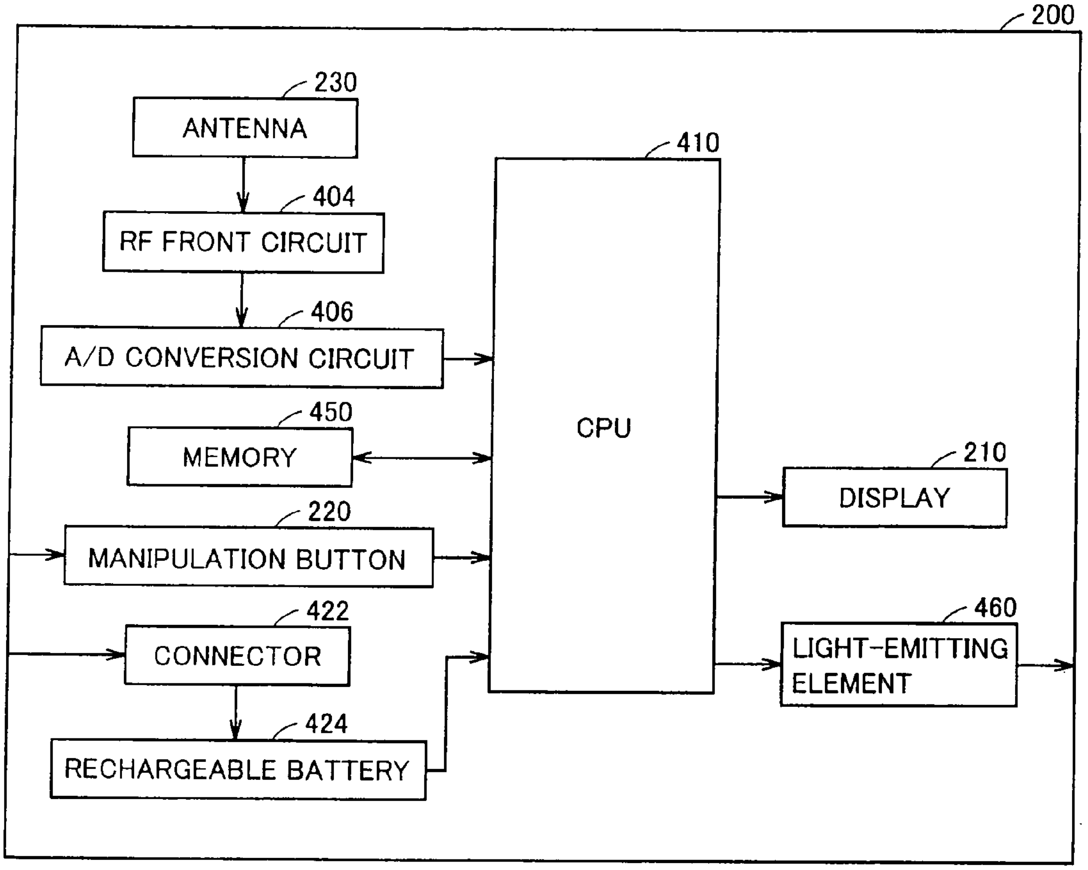
FIG. 4 is a block diagram showing a hardware configuration of remote controller 200.

With reference to FIG. 4, a configuration of remote controller 200 will further be described. FIG. 4 is a block diagram showing a hardware configuration of remote controller 200. In addition to antenna 230, remote controller 200 mainly includes an RF (Radio Frequency) front circuit 404 electrically connected to antenna 230, an A/D (Analog to Digital) conversion circuit 406 electrically connected to RF front circuit 404, a CPU 410 electrically connected to A/D conversion circuit 406, a memory 450, a connector 422, a rechargeable battery 424 electrically connected to connector 422, and a light-emitting element 460 electrically connected to CPU 410.

Antenna 230 receives a signal transmitted by radio through a communication line (such as the Internet). RF front circuit 404 subjects the signal received by antenna 230 to noise removal processing, frequency conversion processing, and the like that are defined in advance, and outputs the processed signal. An analog signal output from RF front circuit 404 is input to A/D conversion circuit 406. A/D conversion circuit 406 converts the analog signal to a digital signal and sends the digital signal to CPU 410.

CPU 410 controls the operation of remote controller 200 based on a signal from A/D conversion circuit 406 or a command from manipulation button 220 as well as on data stored in memory 450. Specifically, in one aspect, CPU 410 attains a function as control portion 310 shown in FIG. 3.

Memory 450 stores data used for generation of the control signal by remote controller 200. Memory 450 is realized, for example, as a flash memory.

Connector 422 is connected to a power supply portion (not shown) provided in cradle 250. Connector 422 accepts power supplied from cradle 250 and supplies a current to rechargeable battery 424. A charging control circuit (not shown) is arranged between connector 422 and rechargeable battery 424. The charging control circuit cuts off a circuit between connector 422 and rechargeable battery 424 when it detects full charge of rechargeable battery 424.

Light-emitting element 460 emits the control signal generated by CPU 410 as the infrared signal.

Figure 5:
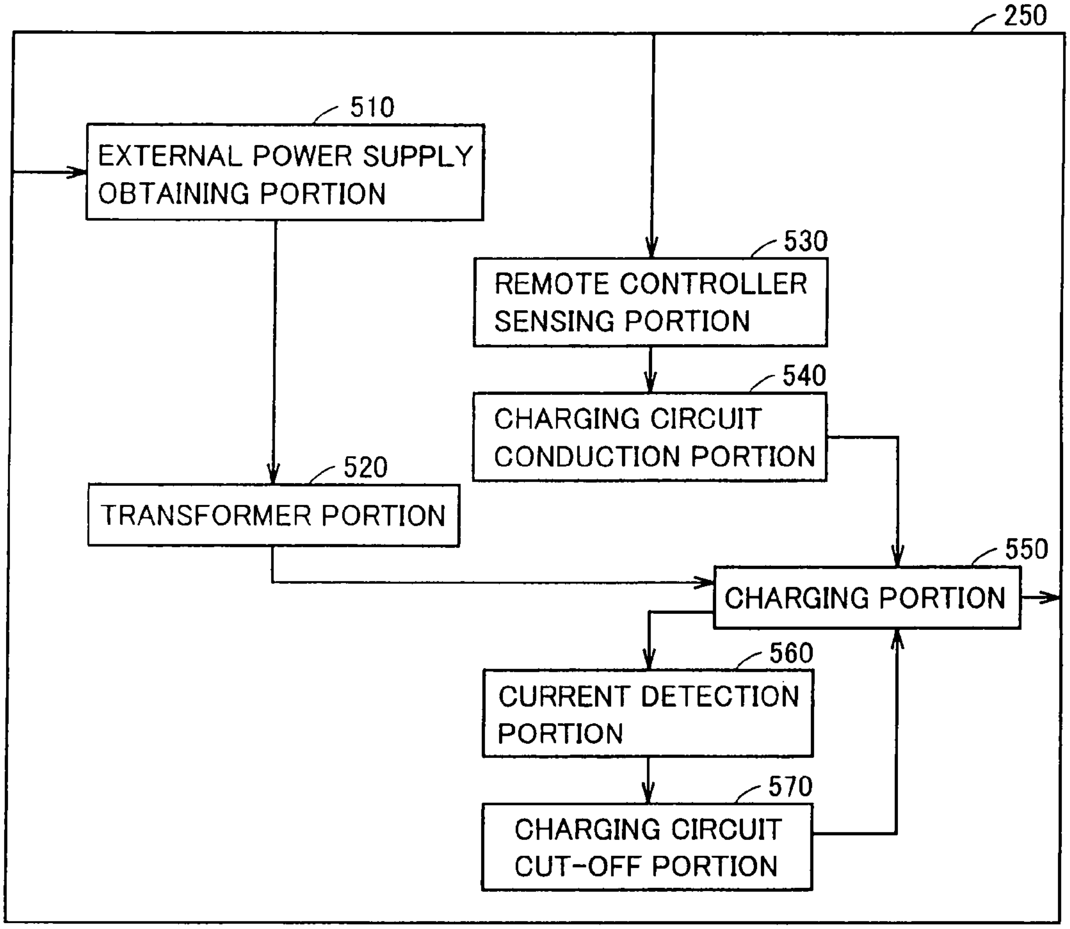
FIG. 5 is a block diagram showing a configuration of functions attained by a cradle 250.

With reference to FIG. 5, a configuration of cradle 250 according to the present embodiment will now be described. FIG. 5 is a block diagram showing a configuration of functions attained by cradle 250.

Cradle 250 includes an external power supply obtaining portion 510, a transformer portion 520, a remote controller sensing portion 530, a charging circuit conduction portion 540, a charging portion 550, a current detection portion 560, and a charging circuit cut-off portion 570.

External power supply obtaining portion 510 is implemented by a cable that can be connected to a general power supply outlet. For example, external power supply obtaining portion 510 is implemented as cable 252. Transformer portion 520 converts power accepted by external power supply obtaining portion 510 to an internal operation voltage value in cradle 250.

Remote controller sensing portion 530 senses whether or not remote controller 200 is placed in cradle 250. Remote controller sensing portion 530 determines whether or not remote controller 200 is mounted on cradle 250, for example, by means of a mechanical switch provided in cradle 250. Alternatively, when a value of a current supplied to the outside by charging portion 550 which will be described later is detected, remote controller sensing portion 530 senses mount of remote controller 200.

When remote controller sensing portion 530 senses mount of remote controller 200, charging circuit conduction portion 540 closes a circuit for power supply from cradle 250 to remote controller 200 by charging portion 550.

Charging portion 550 supplies power to remote controller 200 based on a voltage value obtained after transformation by transformer portion 520. Current detection portion 560 detects a value of current supplied by charging portion 550. When a current value detected by current detection portion 560 attains to 0, charging circuit cut-off portion 570 switches the charging circuit in a conducting state from a closed state to an open state to cut off the circuit, and thus cuts off power supply.

Figure 6:
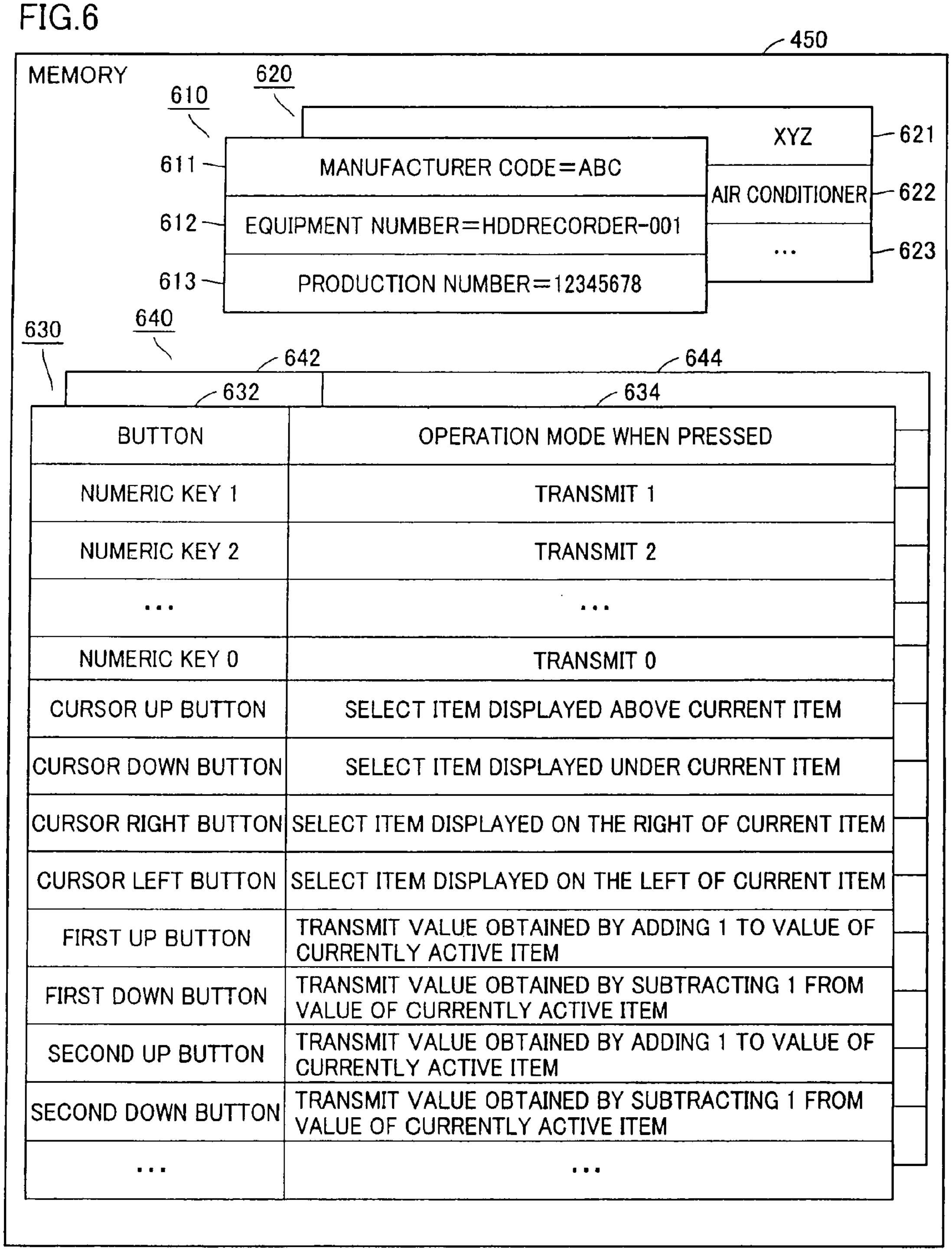
FIG. 6 is a conceptual diagram of one manner of storage of data in a memory 450.

With reference to FIG. 6, a data structure of remote controller 200 will be described. FIG. 6 is a conceptual diagram of one manner of storage of data in memory 450. Memory 450 includes tables 610, 620, 630, and 640. Table 610 includes areas 611 to 613 for storing data. Data representing a manufacturer code (ABC) is stored in area 611. A number representing equipment controlled by remote controller 200 (HDDRECORDER-001) is stored in area 612. A production number of the equipment is stored in area 613.

Table 620 includes areas 621 to 623 for storing data. Data representing a manufacturer code (XYZ) of the equipment controlled by remote controller 200 is stored in area 621. Data representing the equipment (air conditioner) is stored in area 622. A production number is stored in area 623.

Table 630 includes areas 632 and 634 for storing data. Data for identifying a button (corresponding to manipulation button 220) of remote controller 200 is stored in area 632. Data for defining an operation performed in response to pressing of each button is stored in area 634. For example, in table 630, when numeric key "1" is pressed, an instruction signal for transmitting "1" is generated. The equipment (such as a hard disk recorder) that has sensed this signal selects channel "1". Alternatively, in another operation mode (for example, in a character input screen), the equipment accepts the instruction signal as the instruction to input number "1". Alternatively, in yet another example, when a cursor up button is pressed, a control signal is generated such that display for selecting an item to be displayed above the currently displayed item is shown.

Table 630 refers, for example, to data prepared in advance for controlling an operation of the hard disk recorder (table 610). Table 640 includes areas 642 and 644 for storing data. The data stored in table 640 corresponds, for example, to data for controlling an operation of the air conditioner defined in table 620. By associating table 610 with table 630 and table 620 with table 640, one remote controller 200 can attain a function as a remote controller capable of controlling a plurality of pieces of equipment (for example, a hard disk recorder and an air conditioner).

With reference to FIG. 7, a signal 700 received by remote controller 200 will be described. FIG. 7 shows a configuration of signal 700. Signal 700 includes header 710 and data 720.

Header 710 includes data for specifying a sender of signal 700 (sender address), data for specifying a destination of signal 700 (destination address), time and day of transmission of signal 700 by the sender, and data representing data characteristics of signal 700. For example, the sender address corresponds to an address in the network of information communication terminals of other users present outside the place where remote control system 100 is provided. The destination address refers to an address allocated in advance in order for remote control system 100 to communicate over the Internet or other networks. Data attribute represents contents of transmitted signal 700. The example illustrated in FIG. 7 shows that signal 700 is a control code for controlling the equipment.

Specific contents of the control code are as follows. Specifically, data 720 includes data representing a control target (air conditioner), data representing an operation mode of the control target (timer-controlled operation), data associated with the operation mode and representing time and day of start of the operation, data representing a running mode in which the control target is actuated (heating), data specifically specifying detailed control data (such as a set temperature) individually provided to the control target (20° C.=68° F.), and data representing detailed control content (fan level) individually provided to the running mode (low).

Remote controller 200 receiving signal 700 determines whether or not the signal has been emitted from a user registered in advance, by referring to header 710. If signal 700 has been emitted from the user defined in advance, remote controller 200 extracts data 720 and obtains detailed data item included in data 720.

Figure 8:
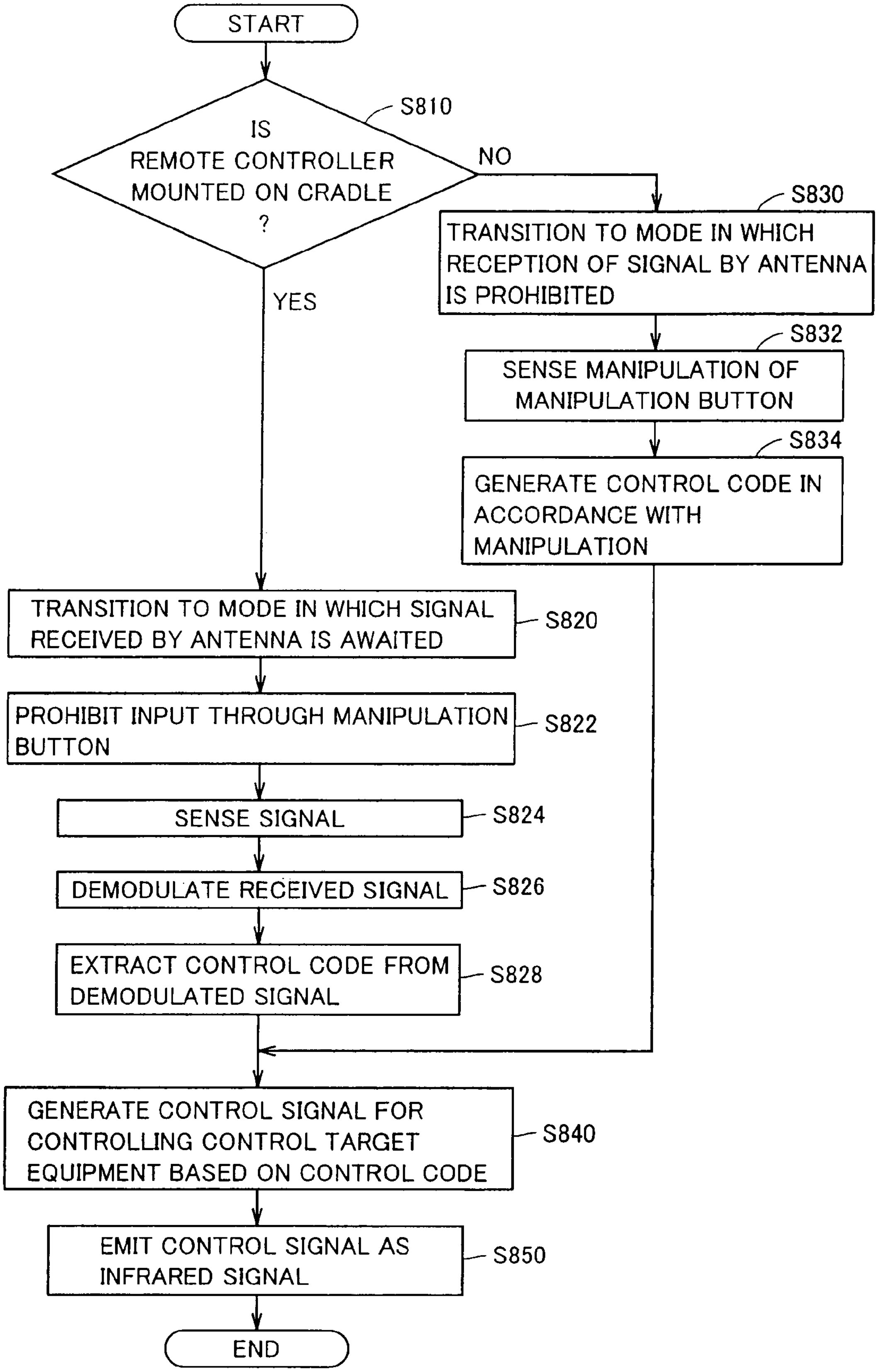
FIG. 8 is a flowchart illustrating a procedure of processing performed by a CPU 410 of remote controller 200.

With reference to FIG. 8, a control structure of remote controller 200 according to the present embodiment will be described. FIG. 8 is a flowchart illustrating a procedure of processing performed by CPU 410 of remote controller 200.

In step S810, serving as placement detection portion 314, CPU 410 determines whether or not remote controller 200 is mounted on cradle 250. When CPU 410 determines that remote controller 200 is mounted on cradle 250 (YES in step S810), control proceeds to step S820. Otherwise (NO in step S810), control proceeds to step S830.

In step S820, CPU 410 causes the mode of remote controller 200 to make transition to a mode in which the signal received by antenna 230 is awaited. Consequently, CPU 410 enters a state in which input of digital data output from A/D conversion circuit 406 can be accepted.

In step S822, CPU 410 detects manipulation of manipulation button 220. Specifically, CPU 410 closes an interface between manipulation button 220 and CPU 410, and cuts off input of the signal from manipulation button 220 to CPU 410.

In step S824, CPU 410 senses reception of the control signal (such as signal 700) by antenna 230, based on the signal from A/D conversion circuit 406. In step S826, CPU 410 demodulates the received signal. In step S828, CPU 410 extracts the control code (such as data 720) from the demodulated signal.

In step S830, CPU 410 causes the operation mode of remote controller 200 to make transition from the mode in which reception of the signal by antenna 230 is permitted to a mode in which it is prohibited. In accordance with transition of the mode, switching between the signal input sources is made. Consequently, CPU 410 no longer accepts the signal output from A/D conversion circuit 406.

In step S832, CPU 410 senses manipulation of manipulation button 220 based on the signal output from manipulation button 220. In step S834, by referring to the data (FIG. 6) stored in memory 450, CPU 410 generates the control code in accordance with manipulation based on the signal.

In step S840, CPU 410 generates the control signal for controlling the control target equipment (such as a hard disk recorder and an air conditioner) based on the generated control code. In step S850, CPU 410 emits the control signal from light-emitting element 460 as the infrared signal.

As described above, according to remote control system 100 of the present embodiment, when remote controller 200 is placed in cradle 250, specifically when remote controller 200 is charged by cradle 250, remote controller 200 prohibits manipulation on hand but permits external manipulation. Consequently, even if manipulation button 220 is manipulated, the signal in accordance with that manipulation is no longer input to CPU 410 and the control signal is not emitted from light-emitting element 460.

On the other hand, if remote controller 200 and cradle 250 are separate from each other, remote controller 200 permits control based on manipulation on hand and prohibits control based on external manipulation. Namely, input to CPU 410, of the signal output in response to pressing of manipulation button 220 is permitted. Consequently, the user holding remote controller 200 manipulates remote controller 200 so as to control the operation of the equipment.

Thus, the operation by using remote controller 200 allowing manipulation on hand and external manipulation can properly be performed. In addition, as manipulation based on the external signal is not performed during manipulation on hand of remote controller 200, convenience of a user who is performing manipulation on hand can be improved.

Embodiment 2

Embodiment 2 of the present invention will be described in the following. The remote control system according to the present embodiment is different from Embodiment 1 described previously in mechanically detecting placement of the remote controller in the cradle.

Figure 9:
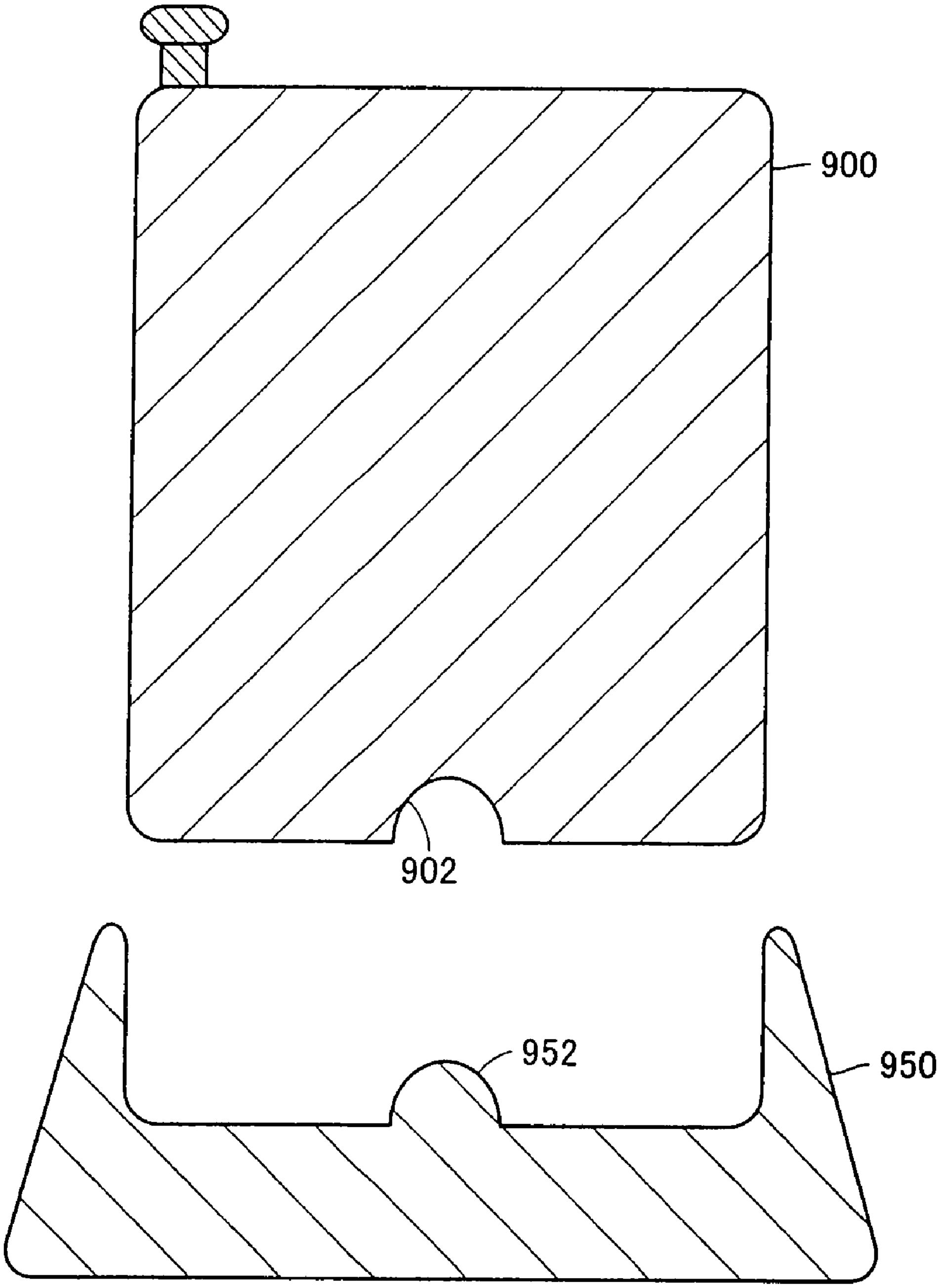
FIG. 9 shows a remote control system according to Embodiment 2 of the present invention.

Specifically, referring to FIG. 9, a remote controller 900 according to the present embodiment has a recess portion 902 formed at a junction surface with a cradle 950. On the other hand, cradle 950 has a projection portion 952 formed, corresponding to recess portion 902. At a coupling portion of recess portion 902 and projection portion 952, a circuit is configured such that the circuit closes when the recess portion and the projection portion are coupled to each other. Alternatively, the circuit may open on such an occasion. In any case, connection between remote controller 900 and cradle 950 can be detected.

Figure 10:
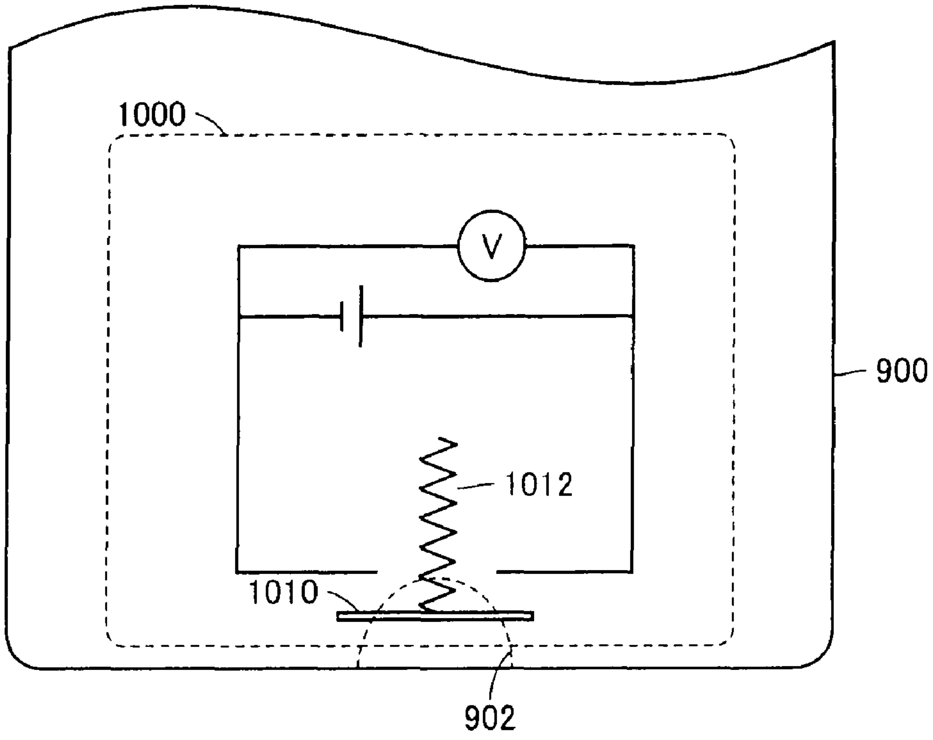
FIG. 10 shows a configuration of a placement detection circuit provided in a remote controller 900.

FIG. 10 shows a configuration of a placement detection circuit provided in remote controller 900. A placement detection circuit 1000 includes a metal piece 1010 and a spring 1012 connected to metal piece 1010. Metal piece 1010 is structured to open placement detection circuit 1000 by means of spring 1012 when projection portion 952 is not present in recess portion 902. On the other hand, when projection portion 952 is fitted into recess portion 902, metal piece 1010 moves toward spring 1012 so as to compress spring 1012, and closes placement detection circuit 1000 that has been open. Consequently, a weak current flows in placement detection circuit 1000, and connection between remote controller 900 and cradle 950 is detected.

As described above, according to remote controller 900 of the present embodiment, even if the rechargeable battery of remote controller 900 is in a full charge state, switching between the signal input sources can mechanically be made so that switching between the external instruction of the operation and direct manipulation of remote controller 900 can be made.

Embodiment 3

Embodiment 3 of the present invention will be described in the following. The remote controller according to the present embodiment is different from each embodiment described previously in a function to display a control state of the equipment or a state of the remote controller. It is noted that the remote controller according to the present embodiment has the same hardware configuration as that of the remote controller according to each embodiment previously described. A newly added function is attained, for example, by adding a program module for display processing by CPU 410. As the functions of the hardware configuration are otherwise the same, description thereof will not be repeated.

Figure 11:
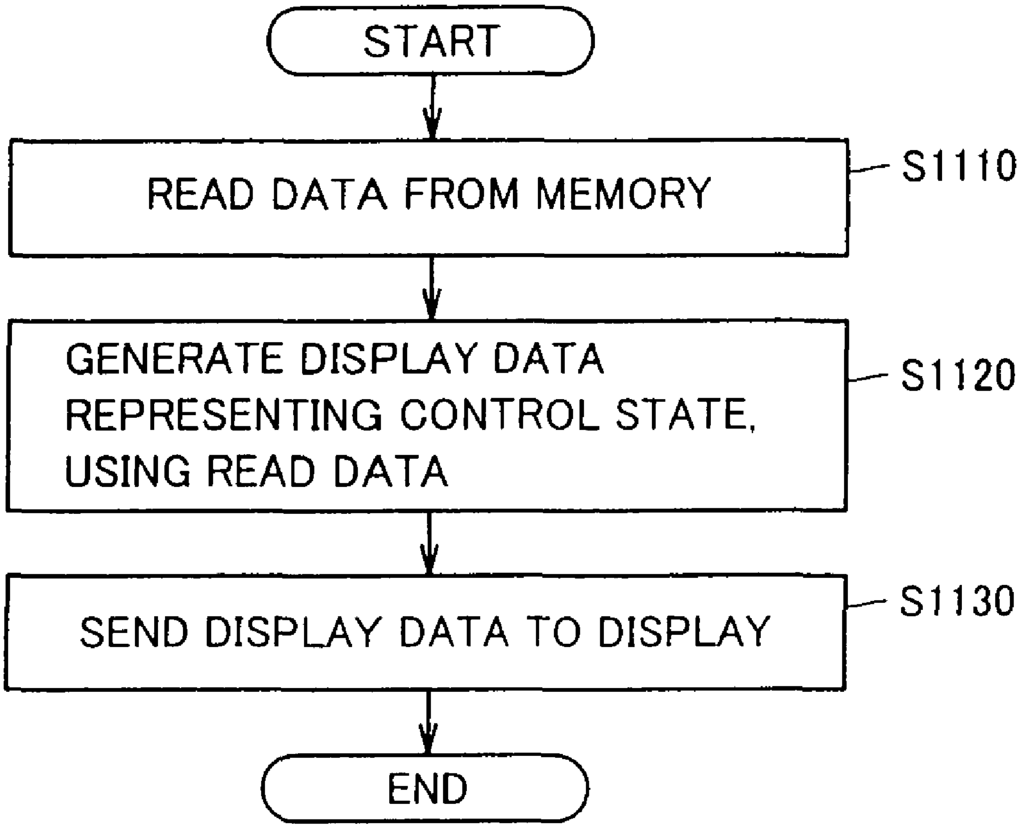
FIG. 11 is a flowchart illustrating a procedure of processing performed by CPU 410.

With reference to FIG. 11, a control structure of a remote controller according to the present embodiment will be described. FIG. 11 is a flowchart illustrating a procedure of processing performed by CPU 410.

In step S1110, CPU 410 reads data from memory 450. The read data includes data representing the instruction that has been input immediately before, data representing an internal state of the remote controller, and the like. In step S1120, CPU 410 generates display data representing a control state, by using the read data. The display data includes at least any of data representing the control state of the remote controller itself and/or the state of the equipment controlled by the remote controller. In step S1130, CPU 410 sends the display data to display 210. Consequently, display 210 displays the state of the remote controller itself or the state of the control target equipment.

Figure 12:
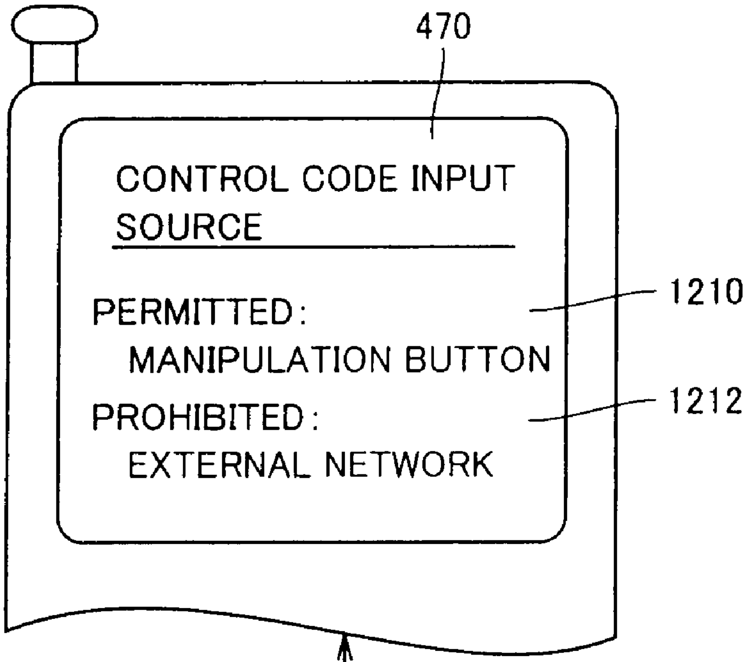
FIG. 12 shows a screen displayed on a display 470.
Figure 12:
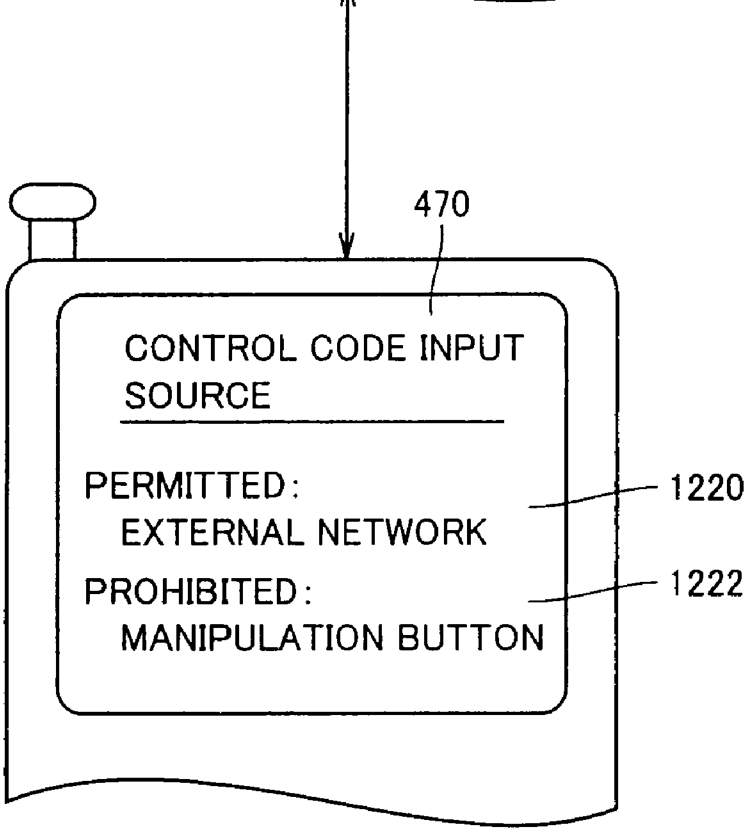

With reference to FIG. 12, a manner of display on the remote controller according to the present embodiment will be described. Screens (A) and (B) are screens displayed on display 470 respectively. When the remote controller according to the present embodiment is not placed in the cradle (namely, when the remote controller is held by the user), the screen on display 470 is as shown in screen (A). Specifically, as to the source of input of the control code, display 470 displays a message 1210 that input through the "manipulation button" is permitted and a message 1212 that input through the "external network" is prohibited. When the remote controller is placed in the cradle in this state (YES in step S810), the remote controller enters a state that the input of the control signal through antenna 230 can be accepted. Then, as shown in screen (B), display 470 displays the screen indicating that the source of input of the control code has been switched. Specifically, as to the source of input of the control code, display 470 displays a message 1220 that input through the "external network" is permitted and a message 1222 that input through the "manipulation button" has been detected.

As described above, according to the remote controller of Embodiment 3 of the present invention, display 470 displays the source of input of the signal to the remote controller. Therefore, the user of the remote controller can readily know a current state of the remote controller. Consequently, invalid manipulation of the remote controller is less likely.

Embodiment 4

Embodiment 4 of the present invention will be described in the following. The remote control system according to the present embodiment is different from each embodiment described previously in its ability to restrict users by granting permission to use the remote control system, based on a password registered in advance.

Figure 13:
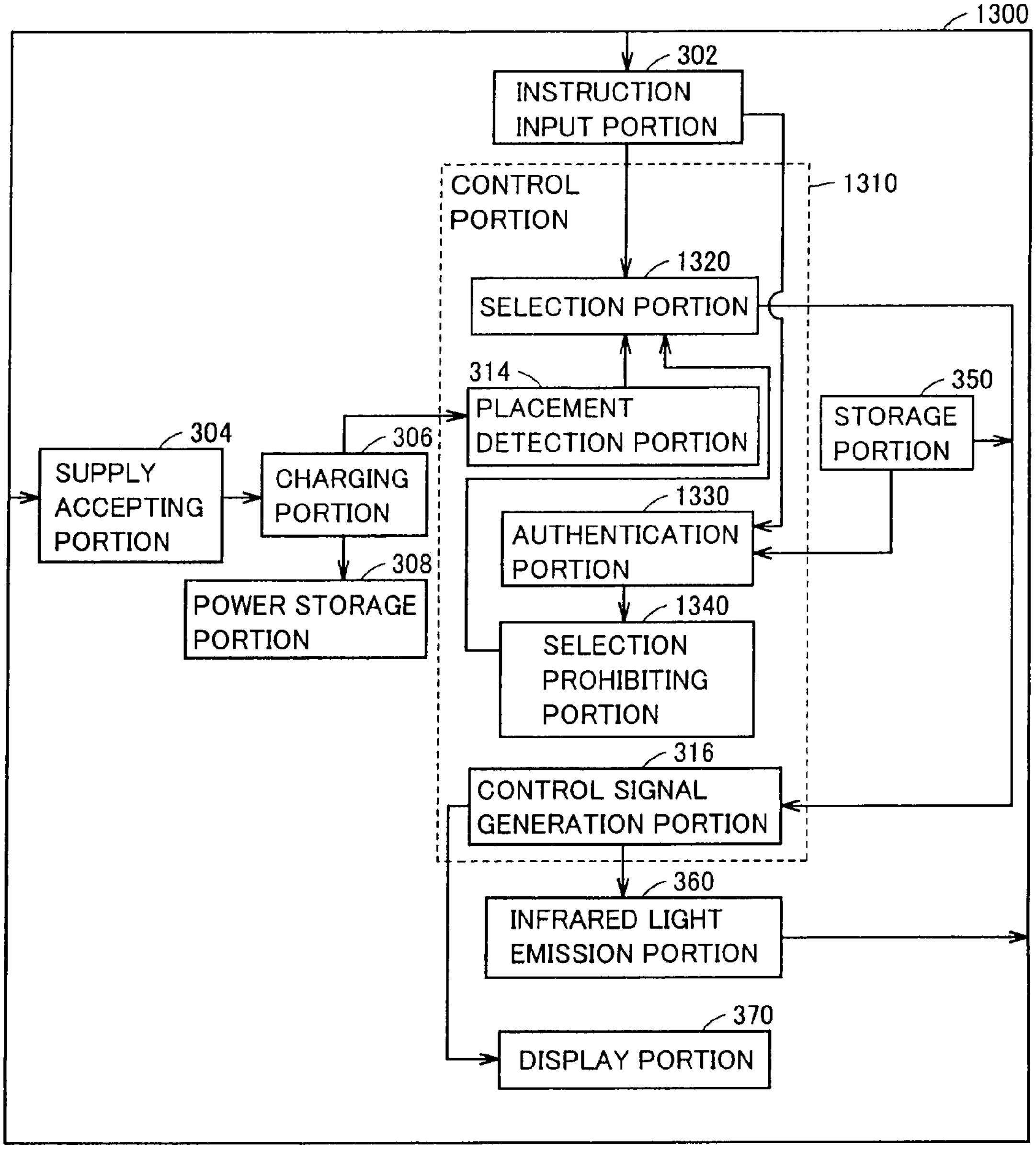
FIG. 13 is a block diagram showing a configuration of functions attained by a remote controller 1300.

With reference to FIG. 13, a configuration of a remote controller 1300 according to the present embodiment will be described. FIG. 13 is a block diagram showing a configuration of functions attained by remote controller 1300. In addition to components shown in FIG. 3, remote controller 1300 includes a selection portion 1320, an authentication portion 1330, and a selection prohibiting portion 1340.

Authentication portion 1330 performs authentication as to whether or not a user who has transmitted the control code is a user registered in advance, based on data output from instruction input portion 302 and data stored in storage portion 350.

Specifically, if the control signal transmitted from the external network (such as signal 700) includes a password defined in advance in addition to the control code, instruction input portion 302 obtains the password from the received signal and sends the same to authentication portion 1330. Meanwhile, the password is registered in advance in storage portion 350. Then, authentication portion 1330 compares the password sent by instruction input portion 302 with the password stored in storage portion 350, and determines whether or not these passwords match. If these passwords match, it is determined that the signal transmitted over the external network has been transmitted by the user registered in advance. On the other hand, if the password sent from instruction input portion 302 does not match with the password stored in storage portion 350, authentication portion 1330 determines that the signal has been transmitted by a user who has not been registered in advance.

Selection prohibiting portion 1340 prohibits selection of the input source by selection portion 1320 based on a result of authentication by authentication portion 1330. Specifically, if the password included in the externally received signal does not match with the password stored in storage portion 350, selection prohibiting portion 1340 prohibits the external input. Alternatively, manipulation through manipulation button 220 may be prohibited. Thus, as only a manipulation by a specified user is permitted, a manipulation by other unintended users can be prevented.

With reference to FIG. 14, a data structure of remote controller 1300 according to the present embodiment will be described. FIG. 14 is a conceptual diagram of one manner of storage of data in memory 450. Memory 450 includes areas 1410 to 1450 for storing data. A number for identifying each record in database of the password registered in remote controller 1300 is stored in area 1410. The password input by each user is stored in area 1420. The code representing the source of input of the control code defined by the password is stored in area 1430. Data representing the source of input of the control code is stored in area 1440. Data for identifying the input source is allocated in area 1450 for each input source. Data stored in area 1430 and area 1450 are identical to each other. Therefore, the password stored in area 1420 is associated with the input source stored in area 1440, on one-to-one basis. Though a plurality of passwords are registered in the example shown in FIG. 14, only a single password may be used. Alternatively, the registered password may be added or deleted.

Figure 15:
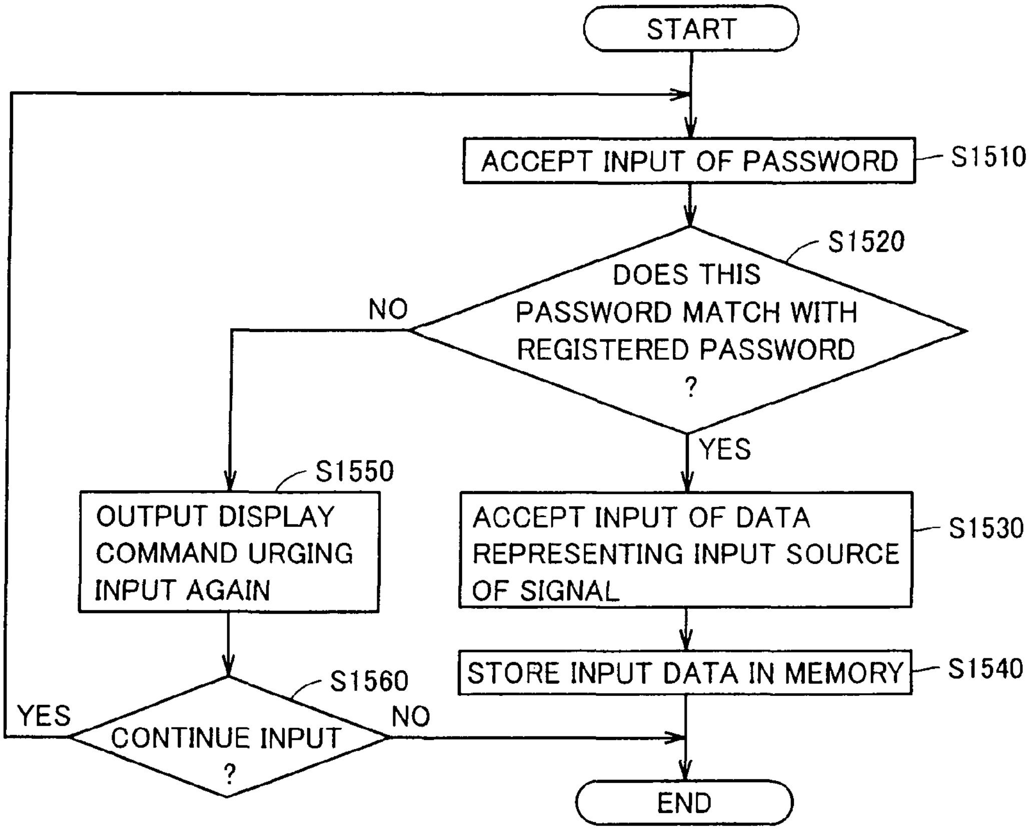
FIG. 15 is a flowchart illustrating a procedure of processing performed by CPU 410 included in remote controller 1300.

With reference to FIG. 15, a control structure of remote controller 1300 according to the present embodiment will be described. FIG. 15 is a flowchart illustrating a procedure of processing performed by CPU 410 included in remote controller 1300.

In step S1510, CPU 410 accepts input of password based on the data input through manipulation button 220. In step S1520, CPU 410 compares the input password with the password stored in memory 450, that is, the password registered in advance, and determines whether or not these passwords match. If CPU 410 determines that these passwords match (YES in step S1520), control proceeds to step S1530. Otherwise (NO in step S1520), control proceeds to step S1550.

In step S1530, CPU 410 accepts input of data representing the source of input of the control signal through manipulation button 220. The data is realized, for example, by the numbers associated with the source of input of the control signal. In step S1540, CPU 410 stores the input data in the area reserved in memory 450.

In step S1550, CPU 410 outputs to display 210, a display command urging input of the password again. Display 210 displays a message that the input password does not match or a message urging input of the password again, based on the command.

In step S1560, CPU 410 determines whether or not input of the password is continued, based on the data input through manipulation button 220. If the user of remote controller 1300 selects to continue input of the password (YES in step S1560), CPU 410 determines that input of the password is continued based on that manipulation. Control returns to step S1510, and a screen urging processing for accepting input of the password, for example, input of the password again, is displayed. Otherwise (NO in step S1560), the processing ends.

As described above, according to the remote controller of the present embodiment, the password is set in advance so that manipulation by the user who has input the password is accepted. Specifically, the remote controller switches between manipulation on hand (manipulation button 220) and external manipulation (input through antenna 230) as the source of input of the control signal. Thus, if a specified user uses the equipment in a preferential manner, control of the equipment based on external manipulation is prevented. Consequently, convenience for the specified user can further be improved.

Embodiment 5

Embodiment 5 of the present invention will be described in the following. The remote control system according to the present embodiment is different from each embodiment described previously in its ability to restrict permission of input for manipulation based on priority defined in advance for each user. The remote control system according to the present embodiment is realized, for example, by employing the hardware configuration included in remote control system 100 according to Embodiment 1. The processing specific to the remote control system of the present embodiment is performed by causing CPU 410 to execute a program module corresponding to that specific processing. As the hardware configuration is otherwise the same, description thereof will not be repeated.

With reference to FIG. 16, a data structure in the remote control system according to the present embodiment will be described. FIG. 16 is a conceptual diagram of one manner of storage of data in memory 450 realizing the remote controller according to the present embodiment.

Memory 450 includes areas 1610 to 1650 for storing data. Data for identifying each record in database of priority allocated for each user is stored in area 1610. Data for identifying each user as a registrant is stored in area 1620. Data representing priority allocated to each registrant is stored in area 1630. In addition, if a specified user performs manipulation at a certain time point, data for identifying that operator is stored in area 1640. The priority allocated in advance to the user is stored in area 1650.

In the example shown in FIG. 16, the operator provided with "user03@jp" as an identifier over the network is registered as the user (area 1640). The priority of the user is "2" (area 1650). Here, even if the control signal is input by an operator having a precedence lower than the priority "2", the signal is not accepted. Consequently, inadvertent manipulation by other users can be prevented.

In contrast, if the control signal is provided from the registrant having priority higher than the priority stored in area 1650, the remote controller accepts input of that signal. Consequently, control by a sender of that control signal instead of the user registered in advance is carried out. By doing so, for example in a case of an emergency, the user can control the equipment in a preferential manner. For example, when the user having lower priority uses the hard disk recorder to reproduce a recorded program but another user having priority higher than the former user's one externally inputs the control signal for programming recording, the hard disk recorder stops reproduction and enters a recording stand-by state.

Figure 17:
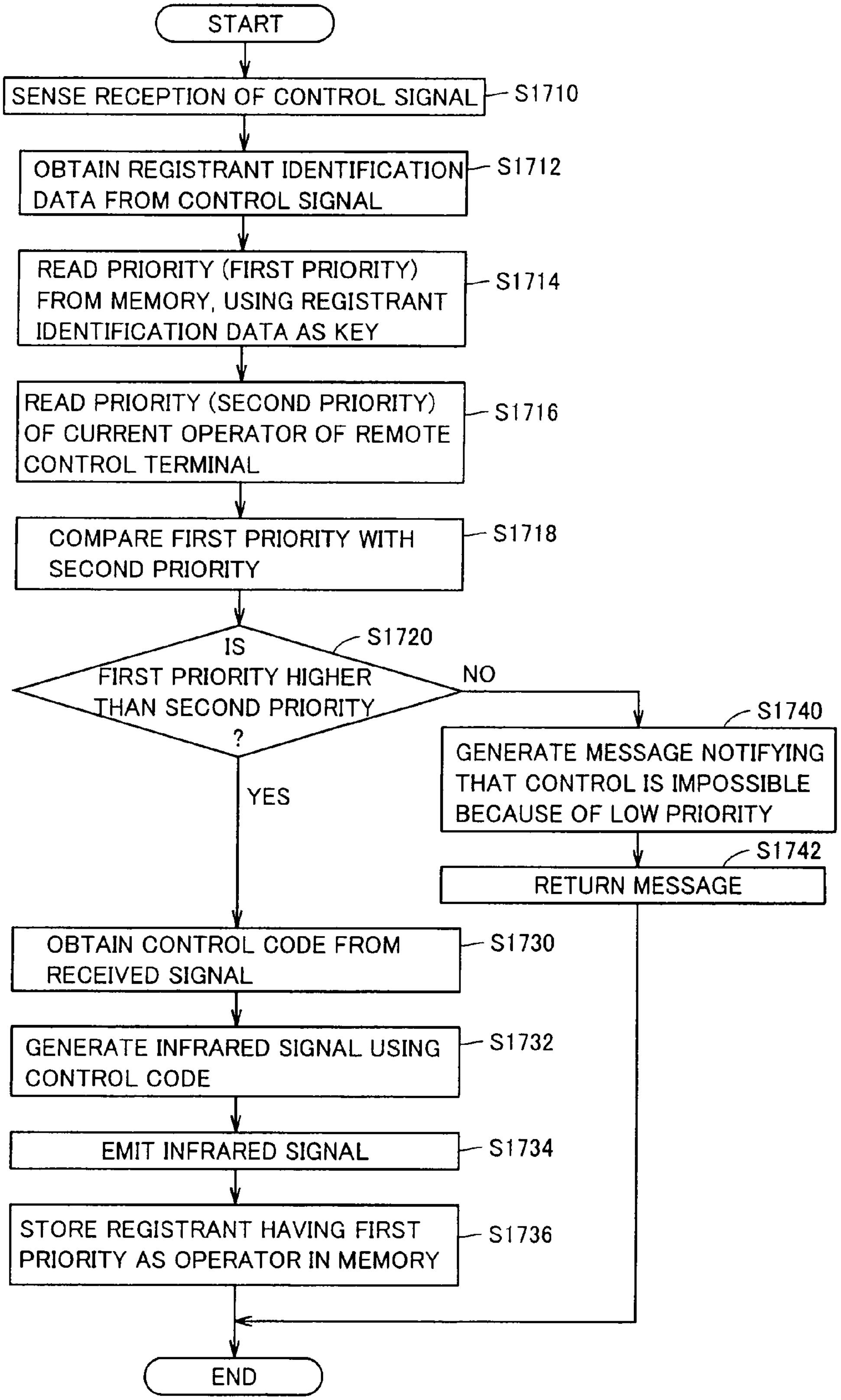
FIG. 17 is a flowchart illustrating a procedure of processing performed by CPU 410 realizing the remote controller according to Embodiment 5 of the present invention.

With reference to FIG. 17, a control structure of the remote controller according to the present embodiment will be described. FIG. 17 is a flowchart illustrating a procedure of processing performed by CPU 410 realizing the remote controller according to the present embodiment.

In step S1710, CPU 410 senses reception of the control signal by antenna 230. In step S1712, CPU 410 obtains registrant identification data included in the received control signal based on the digital data sent from A/D conversion circuit 406. In step S1714, CPU 410 searches memory 450, using the obtained registrant identification data as key, and reads the priority (first priority) provided to the registrant identification data.

In step S1716, CPU 410 reads the priority allocated to the current operator of the remote controller (second priority) by referring to area 1650 in memory 450. In step S1718, CPU 410 compares the first priority with the second priority. In step S1720, CPU 410 determines whether or not the first priority is higher than the second priority. If the first priority is higher than the second priority (YES in step S11720), control proceeds to step S1730. Otherwise (NO in step S1720), control proceeds to step S1740.

In step S1730, CPU 410 obtains the control code (such as data 720) from the control signal received by antenna 230. In step S1732, CPU 410 uses the control code to generate the infrared signal. In step S1734, CPU 410 emits the infrared signal from light-emitting element 460. In step S1736, CPU 410 stores the registrant having the first priority as the current operator of the remote controller, in area 1650 in memory 450.

In step S1740, CPU 410 generates a message notifying that it is impossible to control the equipment because the first priority is lower than the second priority. In step S1742, CPU 410 returns the generated message by referring to the sender of the control signal (such as the sender address in FIG. 7).

As described above, according to the remote controller of Embodiment 5 of the present invention, if a plurality of users share the equipment controlled by the remote controller, control priority is set for each user. The priority is valid also when the user externally controls the equipment. Therefore, regardless of the place where the user is present (present at home/outside the house), manipulation based on the priority can be performed for the equipment.

Embodiment 6

Embodiment 6 of the present invention will be described in the following. The remote control system according to the present embodiment is different from each embodiment described previously in that the cradle attains a function to display a state of the remote controller.

Figure 18:
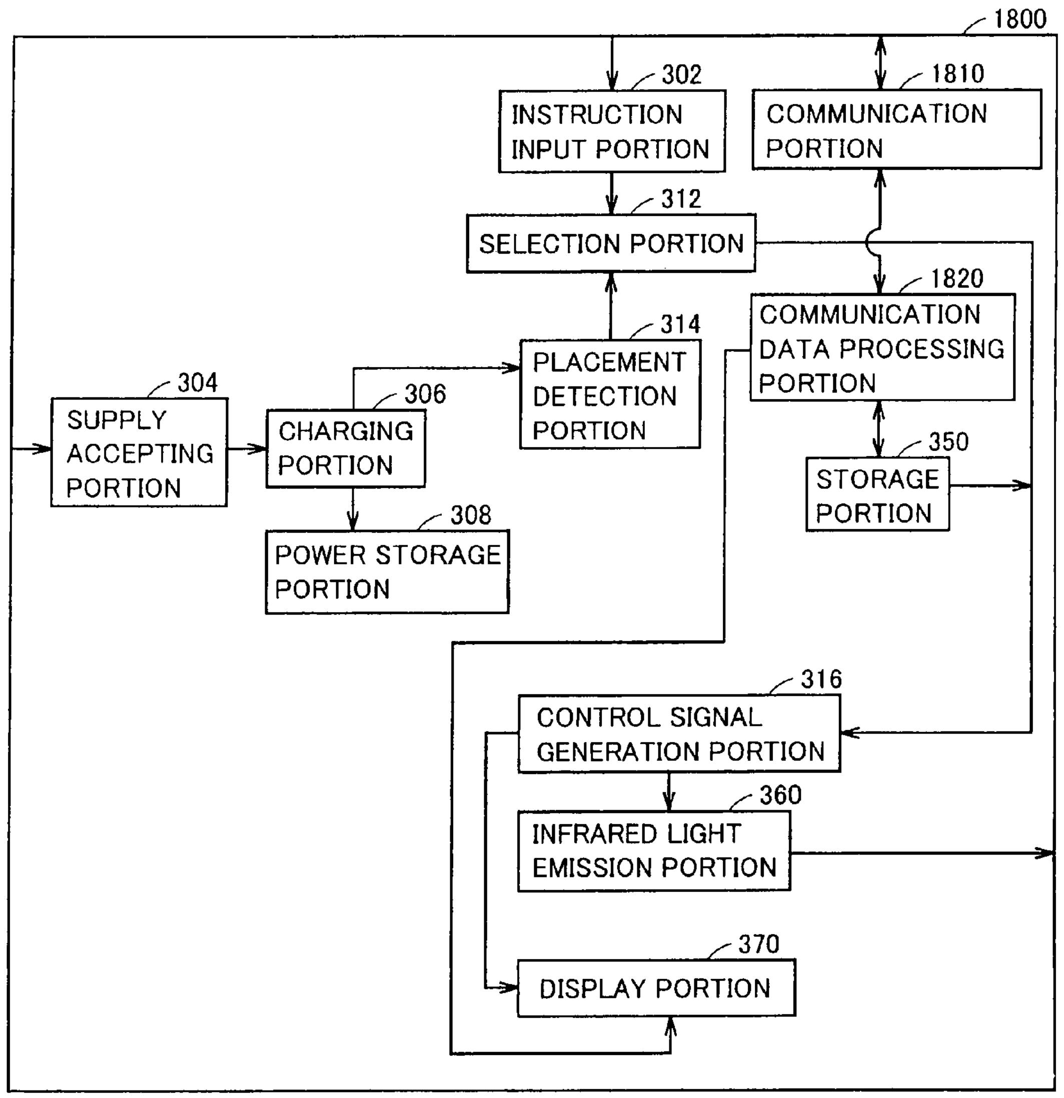
FIG. 18 is a block diagram showing a configuration of functions attained by a remote controller 1800 according to Embodiment 6 of the present invention.

With reference to FIG. 18, a remote controller 1800 according to the present embodiment will be described. FIG. 18 is a block diagram showing a configuration of functions attained by remote controller 1800. In addition to the components shown in FIG. 3, remote controller 1800 includes a radio communication portion 1810 and a communication data processing portion 1820. Radio communication portion 1810 establishes radio communication with the cradle. Communication data processing portion 1820 generates data for transmission to the cradle. Alternatively, communication data processing portion 1820 converts the signal received by radio communication portion 1810 to a digital signal and stores the same in a memory 1350. Alternatively, communication data processing portion 1820 causes display 370 to display the data included in the received signal.

Figure 19:
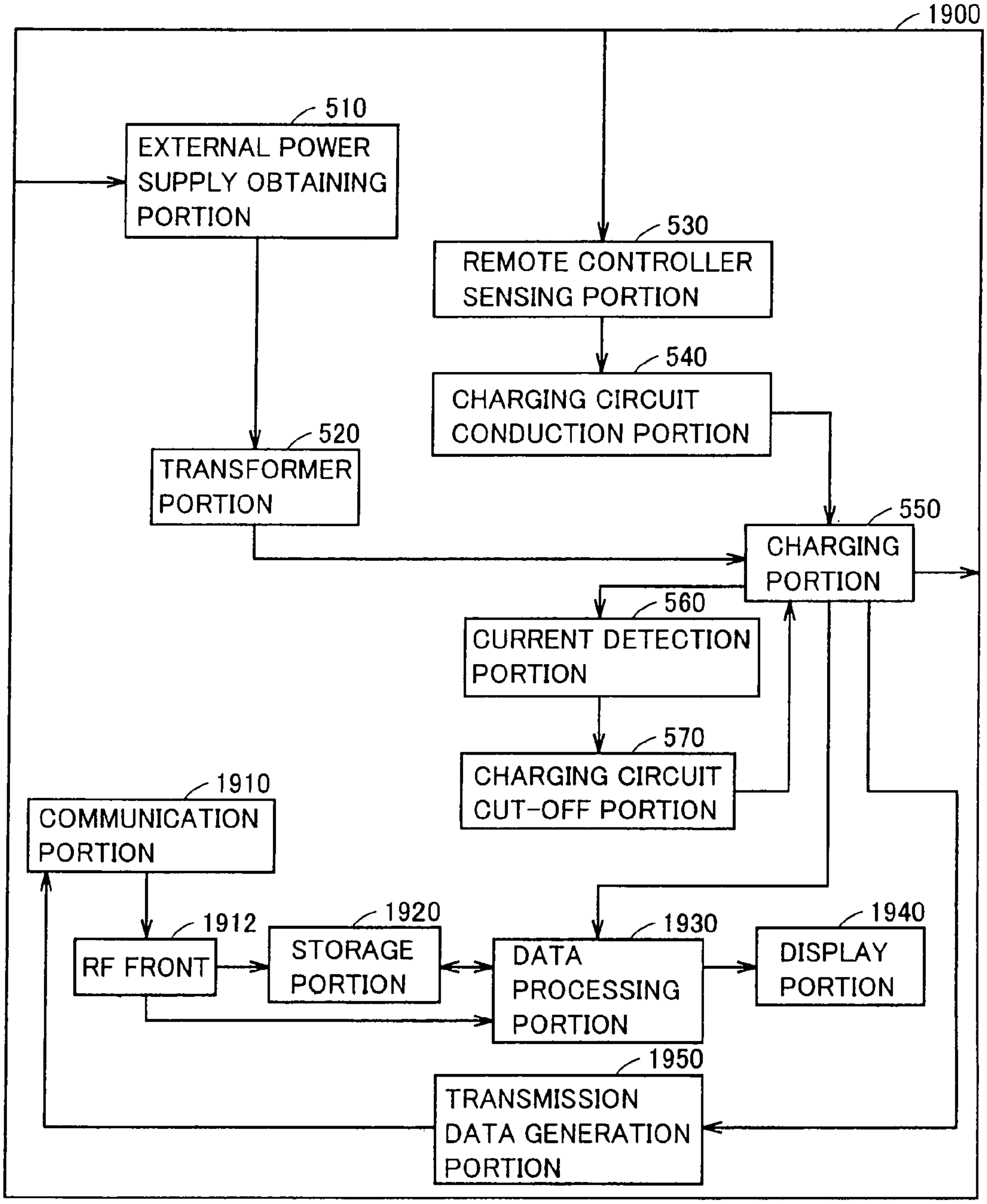
FIG. 19 is a block diagram showing a configuration of functions attained by a cradle 1900 according to the present embodiment.

With reference to FIG. 19, a cradle 1900 according to the present embodiment will be described. FIG. 19 is a block diagram showing a configuration of functions attained by cradle 1900. In addition to the components shown in FIG. 5, cradle 1900 includes a communication portion 1910, a storage portion 1920, a reception data processing portion 1930, a display portion 1940, and a transmission data generation portion 1950.

Communication portion 1910 establishes radio communication with radio communication portion 1810 of remote controller 1800. Storage portion 1920 temporarily stores data included in the signal received by communication portion 1910. Reception data processing portion 1930 generates text to be displayed on display portion 1940, by using the data stored in storage portion 1920. When reception data processing portion 1930 outputs the data to display portion 1940, display portion 1940 displays information included in the signal received by communication portion 1910. Alternatively, reception data processing portion 1930 generates data to be displayed on display portion 1940 based on the signal from charging portion 550. Here, data processing portion 1930 displays a state of cradle 1900.

Display portion 1940 is implemented, for example, by a liquid crystal display or an LED (Light-Emitting Diode).

Transmission data generation portion 1950 generates data for transmission to remote controller 1800, based on the signal from charging portion 550 or the data stored in storage portion 1920. The data includes, for example, data representing the state of cradle 1900. When transmission data generation portion 1950 sends the generated data to communication portion 1910, communication portion 1910 transmits the data by radio. Alternatively, if remote controller 1800 and cradle 1900 are connected to each other, namely, when remote controller 1800 is placed in cradle 1900, communication portion 1910 may directly transmit the signal to communication portion 1810 of remote controller 1800.

Figure 20:
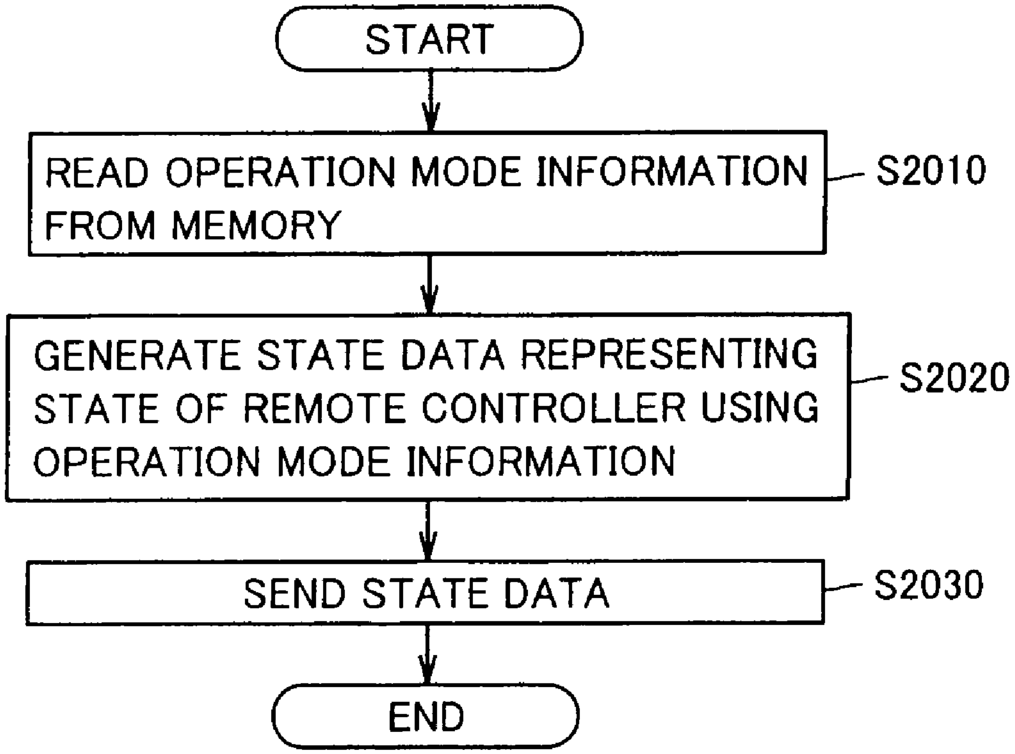
FIG. 20 is a flowchart illustrating a procedure of processing performed by CPU 410 included in remote controller 1800 according to Embodiment 6 of the present invention.

With reference to FIG. 20, a control structure of remote controller 1800 according to the present embodiment will be described. FIG. 20 is a flowchart illustrating a procedure of processing performed by CPU 410 included in remote controller 1800.

In step S2010, CPU 410 reads operation mode information from memory 450. Here, the operation mode information includes information for identifying a transmission source from which input of the control signal is permitted or an operator of remote controller 1800, and the like. In step S2020, CPU 410 generates state data representing a state of remote controller 1800 by using the operation mode information. In step S2030, CPU 410 emits the state data through communication portion 1810.

Figure 21:
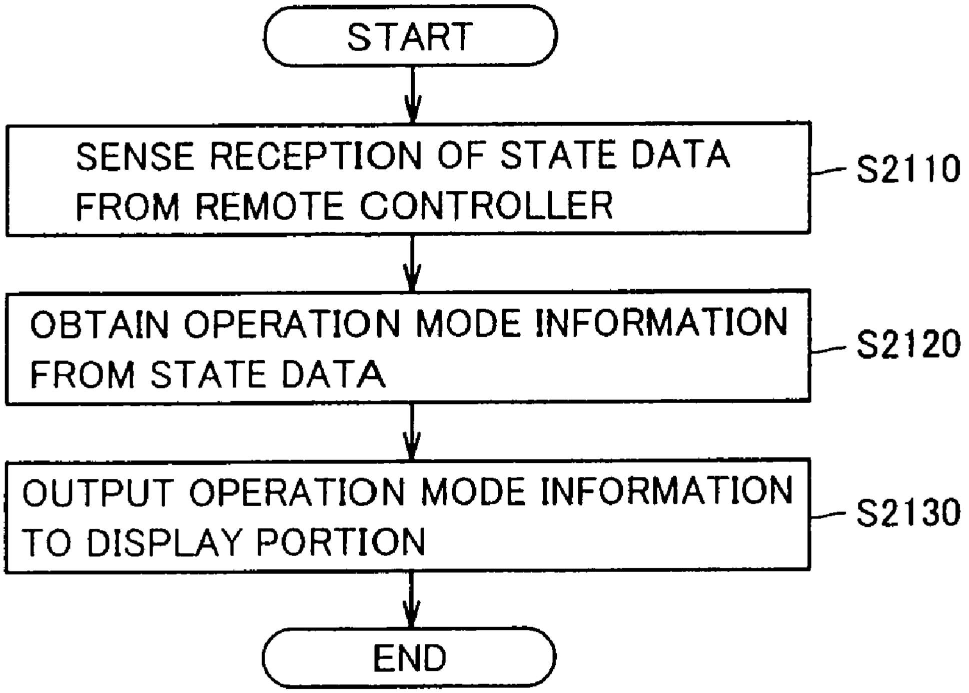
FIG. 21 is a flowchart illustrating a procedure of processing performed by cradle 1900.

With reference to FIG. 21, a control structure of cradle 1900 according to the present embodiment will be described. FIG. 21 is a flowchart illustrating a procedure of processing performed by cradle 1900.

In step S2110, data processing portion 1930 senses reception of the state data from remote controller 1800, based on a signal from an RF front circuit 1912. In step S2120, data processing portion 1930 obtains the operation mode information from the state data. Data processing portion 1930 causes storage portion 1920 to temporarily retain the obtained information. In addition, in step S2130, data processing portion 1930 reads the data stored in storage portion 1920 and sends the data to display portion 1940. Consequently, display portion 1940 displays the state of remote controller 1800.

Figure 22:
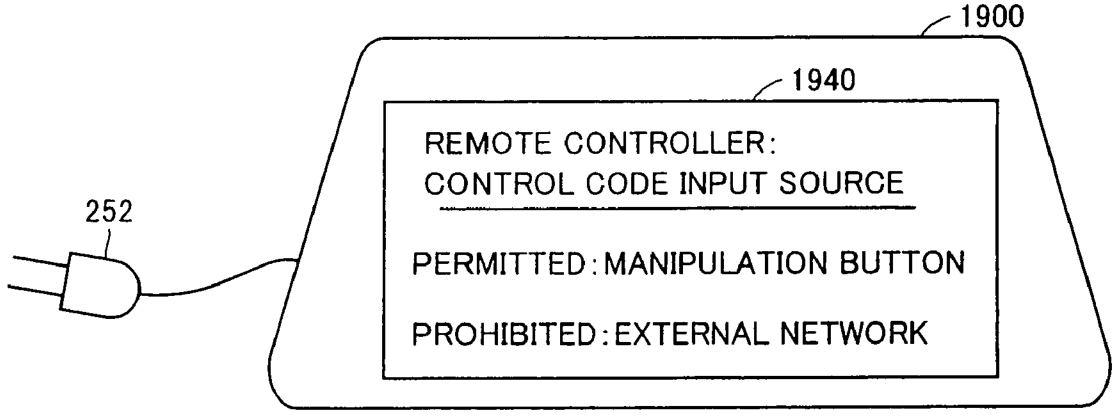
FIG. 22 shows display on a display portion 1940 of cradle 1900.

With reference to FIG. 22, a manner of display on cradle 1900 will now be described. FIG. 22 shows display on display portion 1940.

When cradle 1900 receives the signal from remote controller 1800, cradle 1900 reads a data item included in the signal, and generates display data for displaying character information representing the state of remote controller 1800, based on the data item and fixed-format text data defined in advance. When the display data is sent to display portion 1940, display portion 1940 displays the state of remote controller 1800 as character information.

As to the source of input to the remote controller, the example illustrated in FIG. 22 shows that the input through the "manipulation button" is currently permitted and the input through the "external network" is prohibited.

As described above, according to the remote control system of Embodiment 6 of the present invention, cradle 1900 displays the state of remote controller 1800 based on the signal emitted from remote controller 1800. Consequently, the user can readily know the state of remote controller 1800.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control system comprising:

a remote control terminal configured to control equipment; and a cradle apparatus configured to accept placement of the remote control terminal, wherein the remote control terminal comprises:

a reception portion configured to receive a signal instructing control of the equipment through a communication line;

an input portion configured to accept input of an instruction for controlling the equipment;

a detection portion configured to detect whether the remote control terminal is placed in the cradle apparatus;

a selection portion configured to select a source of input of a signal for generating the control signal for controlling the equipment based on a result of detection by the detection portion, wherein the source is selected from either the reception portion or the input portion;

a generation portion configured to generate the control signal based on a signal from the source of input selected by the selection portion;

an emission portion configured to emit the control signal;

a storage portion configured to store control data defining selection of the source of input;

a prohibiting portion configured to prohibit selection by the selection portion based on external input of the control data when the remote control terminal is not placed in the cradle apparatus; and a switching portion configured to select the reception portion as the source of input.

2. The remote control system according to claim 1, wherein the remote control terminal further comprises a power storage portion, wherein the cradle apparatus comprises a power supply portion configured to accept external supply of power and a charging portion configured to charge the power storage portion based on the power, and wherein the detection portion detects placement of the remote control terminal in the cradle apparatus based on sensing of charging to the power storage portion.

3. The remote control system according to claim 1, wherein the remote control terminal further comprises a housing comprising a recess portion, wherein the cradle apparatus comprises a projection portion corresponding to the recess portion formed, and wherein the detection portion detects placement of the remote control terminal in the cradle apparatus based on sensing of fitting of the recess portion and the projection portion to each other.

4. The remote control system according to claim 1, wherein the selection portion selects the reception portion as the source of input when it is detected that the remote control terminal is placed in the cradle apparatus, and selects the input portion as the source of input when it is detected that the remote control terminal is not placed in the cradle apparatus.

5. The remote control system according to claim 1, wherein the remote control terminal further comprises a display portion displaying a state of the remote control terminal.

6. The remote control system according to claim 1, wherein the storage portion stores a password input in advance through the input portion, and wherein the switching portion checks whether data newly input through the input portion matches with the password and selects the reception portion as the source of input when the data matches with the password.

7. The remote control system according to claim 6, wherein the remote control terminal further comprises:

a storage portion configured to store control data defining selection of the source of input;

a prohibiting portion configured to prohibit selection by the selection portion based on external input of the control data when the remote control terminal is placed in the cradle apparatus; and a switching portion configured to select the input portion as the source of input.

8. The remote control system according to claim 1, wherein the storage portion stores a password input in advance through the input portion, and wherein the switching portion performs authentication by checking whether data newly input through the input portion matches with the password and selects the input portion as the source of input when the data matches with the password.

9. The remote control system according to claim 1, wherein the remote control terminal further comprises:

a storage portion configured to store a state data representing a state of the remote control terminal; and a transmission portion transmitting the state data to the cradle apparatus, and wherein the cradle apparatus further comprises:

a reception portion configured to receive the state data; and a display portion configured to display a state of the remote control terminal based on the state data.

10. The remote control system according to claim 1, wherein the signal received by the reception portion comprises identification data that specifies a transmission source of the signal, wherein the remote control terminal further comprises:

a storage portion configured to store the identification data and precedence data, the precedence data being associated in advance with the identification data and defining priority of a plurality of pieces of the identification data; and an obtaining portion configured to obtain the identification data from the signal received by the reception portion, and wherein when the reception portion selected as the source of input receives signals from a plurality of transmission sources, the generation portion selects a signal transmitted from any of the plurality of transmission sources based on the identification data obtained by the obtaining portion and the precedence data associated with the identification data, and generates the control signal based on the selected signal.

11. A remote control system comprising:

a remote control terminal configured to control equipment; and a cradle apparatus configured to accept placement of the remote control terminal, wherein the remote control terminal comprises:

a reception portion configured to receive a signal instructing control of the equipment through a communication line;

an input portion configured to accept input of an instruction for controlling the equipment;

a detection portion configured to detect whether the remote control terminal is placed in the cradle apparatus;

a selection portion configured to select a source of input of a signal for generating the control signal for controlling the equipment based on a result of detection by the detection portion, wherein the source is selected from either the reception portion or the input portion;

a generation portion configured to generate the control signal based on a signal from the source of input selected by the selection portion;

an emission portion configured to emit the control signal;

a storage portion configured to store a state data representing a state of the remote control terminal; and a transmission portion transmitting the state data to the cradle apparatus, wherein the cradle apparatus comprises:

a reception portion configured to receive the state data; and a display portion configured to display a state of the remote control terminal based on the state data; and a prohibiting portion configured to prohibit selection by the selection portion based on external input of the control data when the remote control terminal is not placed in the cradle apparatus.

12. A remote control system comprising:

a remote control terminal configured to control equipment; and a cradle apparatus configured to accept placement of the remote control terminal, wherein the remote control terminal comprises:

a reception portion configured to receive a signal instructing control of the equipment through a communication line, wherein the signal received by the reception portion comprises identification data that specifies a transmission source of the signal;

an input portion configured to accept input of an instruction for controlling the equipment;

a detection portion configured to detect whether the remote control terminal is placed in the cradle apparatus;

a selection portion configured to select a source of input of a signal for generating the control signal for controlling the equipment based on a result of detection by the detection portion, wherein the source is selected from either the reception portion or the input portion;

a generation portion configured to generate the control signal based on a signal from the source of input selected by the selection portion;

an emission portion configured to emit the control signal;

a storage portion configured to store the identification data and precedence data, the precedence data being associated in advance with the identification data and defining priority of a plurality of pieces of the identification data; and an obtaining portion configured to Obtain the identification data from the signal received by the reception portion, and wherein when the reception portion selected as the source of input receives signals from a plurality of transmission sources, the generation portion selects a signal transmitted from any of the plurality of transmission sources based on the identification data obtained by the obtaining portion and the precedence data associated with the identification data, and generates the control signal based on the selected signal; and a prohibiting portion configured to prohibit selection by the selection portion based on external input of the control data when the remote control terminal is not placed in the cradle apparatus.

* * * * *